United States Patent
Nwabueze

(10) Patent No.: US 6,959,306 B2
(45) Date of Patent: Oct. 25, 2005

(54) METHODS FOR DYNAMICALLY ACCESSING, PROCESSING, AND PRESENTING DATA ACQUIRED FROM DISPARATE DATA SOURCES

(75) Inventor: E. Kenneth Nwabueze, Porter Ranch, CA (US)

(73) Assignee: SageMetrics Corporation, North Hollywood, CA (US)

( * ) Notice: Subject to any disclaimer, the term of this patent is extended or adjusted under 35 U.S.C. 154(b) by 10 days.

(21) Appl. No.: 10/654,541

(22) Filed: Sep. 2, 2003

(65) Prior Publication Data

US 2004/0044665 A1 Mar. 4, 2004

Related U.S. Application Data

(62) Division of application No. 09/810,676, filed on Mar. 15, 2001, now Pat. No. 6,643,635.

(51) Int. Cl.⁷ .............................................. G06F 17/30
(52) U.S. Cl. .......................... 707/104.1; 707/2; 707/10; 706/13; 714/1
(58) Field of Search .......................... 707/1, 3, 10, 100, 707/102, 103 R, 2, 104.1; 705/50; 710/65; 711/4, 6, 100; 714/1, 763; 706/13

(56) References Cited

U.S. PATENT DOCUMENTS

| | | | | |
|---|---|---|---|---|
| 4,864,497 A | * | 9/1989 | Lowry et al. ................ 707/102 |
| 5,261,080 A | * | 11/1993 | Khoyi et al. .................. 710/65 |
| 5,319,777 A | * | 6/1994 | Perez .......................... 707/10 |
| 5,359,468 A | * | 10/1994 | Rhodes et al. ................. 360/48 |
| 5,403,639 A | * | 4/1995 | Belsan et al. ................ 707/204 |
| 5,611,066 A | * | 3/1997 | Keele et al. ................. 711/100 |
| 5,684,990 A | * | 11/1997 | Boothby ...................... 707/203 |
| 5,761,696 A | * | 6/1998 | Giordano et al. ............... 707/3 |
| 5,813,009 A | * | 9/1998 | Johnson et al. .............. 707/100 |
| 5,852,819 A | * | 12/1998 | Beller ........................... 707/1 |
| 5,870,733 A | * | 2/1999 | Bass et al. ...................... 707/2 |
| 6,334,126 B1 | * | 12/2001 | Nagatomo et al. .............. 707/4 |
| 6,338,056 B1 | * | 1/2002 | Dessloch et al. ............... 707/2 |
| 6,456,997 B1 | * | 9/2002 | Shukla .......................... 707/1 |
| 6,473,764 B1 | * | 10/2002 | Petculescu et al. .......... 707/102 |
| 6,519,598 B1 | * | 2/2003 | Sagawa et al. ............... 707/10 |
| 6,549,906 B1 | * | 4/2003 | Austin et al. ................. 707/10 |
| 6,594,672 B1 | * | 7/2003 | Lampson et al. ........ 707/103 R |
| 6,609,114 B1 | * | 8/2003 | Gressel et al. ................ 705/50 |

FOREIGN PATENT DOCUMENTS

WO    WO 96/21898    *   7/1996    ............. G06F/9/00

* cited by examiner

Primary Examiner—Shahid Al Alam
(74) Attorney, Agent, or Firm—Martine Penilla & Gencarella, LLP

(57) ABSTRACT

Methods for acquiring and transforming data for business analysis, and computer readable media having program instructions for enabling the same are provided. One exemplary method identifies a set of data sources to be accessed for a user, loads the raw data from each of the accessed set of data sources to raw data type specific locations then verifies the integrity of the acquired raw data. Next the acquired raw data of each of the raw data type specific locations is transformed to a uniform data type and then stored as processed data into processed data type specific locations. Some notable advantages of the discussed methods of acquiring and presenting data for business analysis purposes is the ability to efficiently extract, organize and present the data as requested by a customer over a world wide computer network. Examples of such efficiency include the ability to convert data acquired from disparate sources to a uniform format, thus allowing centralization of the data and eliminating the need to continually access various data sources to provide requested reports. The customer can thus be provided with dynamic reports in real-time, thereby allowing for time sensitive and mission critical business decisions to be made with current data.

9 Claims, 20 Drawing Sheets

258

| Channel | | | | | | Pageviews | Entrances | Exits | Singles |
|---|---|---|---|---|---|---|---|---|---|
| Country | visit year | visit month | visit week | visit day | | | | | |
| ⊟Argentina | ⊟2000 | ⊟7 | ⊟3 | 13 | | 66,841 | 9,338 | 24,364 | 4,863 |
| | | | | 14 | | 221,872 | 14,066 | 25,418 | 5,781 |
| | | | | 15 | | 25,317 | 3,004 | 8,895 | 1,593 |
| | | | | Total | | 313,830 | 26,408 | 58,677 | 12,237 |
| | | | Total | | | 313,830 | 26,408 | 58,677 | 12,237 |
| | | Total | | | | 313,830 | 26,408 | 58,677 | 12,237 |
| Total | | | | | | 313,830 | 26,408 | 58,677 | 12,237 |
| ⊟Brazil | ⊟2000 | ⊟7 | ⊟3 | 13 | | 403,917 | 6,892 | 8,934 | 453 |
| | | | | 14 | | 343,455 | 5,901 | 11,785 | 819 |
| | | | | 15 | | 363,124 | 4,108 | 10,236 | 384 |
| | | | | Total | | 1,110,496 | 16,901 | 30,955 | 1,656 |
| | | | Total | | | 1,110,496 | 16,901 | 30,955 | 1,656 |
| | | Total | | | | 1,110,496 | 16,901 | 30,955 | 1,656 |
| Total | | | | | | 1,110,496 | 16,901 | 30,955 | 1,656 |
| ⊟Chile | ⊟2000 | ⊟7 | ⊟3 | 13 | | 10,847 | 1,402 | 4,217 | 701 |
| | | | | 14 | | 31,570 | 1,811 | 3,550 | 246 |
| | | | | 15 | | 5,593 | 487 | 2,073 | 213 |
| | | | | Total | | 47,810 | 3,500 | 9,840 | 1,160 |
| | | | Total | | | 47,810 | 3,500 | 9,840 | 1,160 |
| | | Total | | | | 47,810 | 3,500 | 9,840 | 1,160 |
| Total | | | | | | 47,810 | 3,500 | 9,840 | 1,160 |
| ⊟Colombia | ⊟2000 | ⊟7 | ⊟3 | 13 | | 2,791 | 572 | 1,544 | 347 |

FIG. 10

METHODS FOR DYNAMICALLY ACCESSING, PROCESSING, AND PRESENTING DATA ACQUIRED FROM DISPARATE DATA SOURCES

CROSS-REFERENCE TO RELATED APPLICATION

This application is a divisional of application Ser. No. 09/810,676, filed Mar. 15, 2001 now U.S. Pat. No. 6,643,635, the disclosure of which is incorporated herein by reference.

BACKGROUND OF THE INVENTION

1. Field of the Invention

This invention relates generally to data analysis and more particularly to a system and method for analyzing and aggregating an unlimited amount of data and delivering customizable reports generally used for business intelligence purposes.

2. Description of the Related Art

Vast amounts of data are available for corporations concerning their customers. A business has numerous contact points with customers including but not limited to the Internet, Interactive Voice Response (IVR) systems, private company databases, and Enterprise Resource Planning (ERP) systems. Each of these customer contact points or data sources contain data capable of being mined for business intelligence purposes.

The Internet has allowed unlimited access for customers to a company's web site. This unlimited access creates a wealth of information in the form of web log files. Companies can use the web log files to extract information concerning the customers use of the web site.

An organization may have a phone system capable of Interactive Voice Response that customers routinely access. Data stored in the IVR data files can be presented to provide a profile of a customer's use of the IVR system. In addition, private company databases also contain data files that can be mined for business intelligence purposes.

Typically a business will have in-house databases containing accounting, financial and sales data. These in-house databases are commonly referred to as ERP systems and are a valuable source of financial data.

It can be appreciated that there are a large number of sources containing data that can be aggregated by businesses to analyze customer interactions. The data contained in each of the above referenced data sources consists of various data formats. Under current practices, analyzing and generating meaningful reports from the various data sources is an expensive and time-consuming process.

In order to effectively extract and organize the data, a company often times requires professional data handlers such as system administrators, database administrators, programmers and business analysts to analyze each data file, to understand the data type and to organize the relevant information. The professional data handlers then take the relevant data and place it in a uniform format (e.g., tables database formats, spreadsheet formats, etc.), thereby generating a static report summarizing the information associated with the business parameters of interest and customer interaction with various forms of data. For a large enterprise this effort can take teams of professionals whose sole focus is to routinely analyze this data and continually format the data to generate the static reports. For example, FIG. 1 displays a flowchart of the current process employed by industry. The various data files (DF1, DF2, DF3, and DFn) represent the vast amount of data available to an organization. Typical data files include web log files 102a, phone system data 102b, private company databases 102c and in-house operations data 102n. As described above, the data contained in each of the data files are of various formats. Each of the data files must be looked at to understand the data type and organize the data 104a, 104b, 104c and 104n. This is performed manually by professional data handlers 106. The professional data handlers 106 manipulate the data so that the data can be presented in a static report 108 that is dated.

In addition, the manual data handling described above places the information extracted from each individual data file into a separate database, each database having a common format. Therefore, retrieval of the information is from a number of databases and not from a central location, thereby resulting in inefficiencies in manipulating, storing, and then presenting the requested data. It is also important to note that such pre-processing of the data can take so much time that the data that is finally presented is actually dated. For this reason alone, the resultant data is oftentimes rendered useless for making time sensitive decisions regarding important business actions in response to customer activity. Much of the aforementioned problems with data manipulation and business intelligence services arise because of the lack of any software capable of extracting, organizing and uniformly formatting the required data from the various customer contact points, without excessive human interaction by computer programmers and other professionals. Moreover, report updates require the entire process to be repeated, thereby incurring a high cost and not allowing for the generation of true on demand reports. Accordingly, these services tend to be limited to large organizations that can afford the costs of processing the data from the various data sources.

As a result, there is a need for a solution to solve the problems of the prior art to effectively extract, organize and uniformly format the customer interaction data from various customer contact points and other business data sources. There is also a need for methods that enable accurate, efficient and timely presentation of the uniformly formatted data in the form of user requested reports.

SUMMARY OF THE INVENTION

Broadly speaking, the present invention fills these needs by providing a flexible dynamic and efficient method for acquiring and presenting data from various sources to be used for business intelligence purposes. It should be appreciated that the present invention can be implemented in numerous ways, including as a process, an apparatus, a system, computer readable media, or a device. Several inventive embodiments of the present invention are described below.

In one embodiment, a method for acquiring and presenting data for business analysis is provided. In this embodiment, the method identifies a set of data sources to be accessed, accesses the data sources and then acquires raw data from each of the data sources. Then the acquired raw data is stored into raw data type specific compartments, such that each raw data type specific compartment is associated with a set of data sources. Next the acquired raw data is pre-processed to ensure data integrity. Then the acquired raw data from each raw data type specific compartment is transferred to processed data type specific compartments defining processed data. The transfer process is configured to detect a data type of each raw data type specific compartment and load data components of each raw data type specific compartment into respective processed data type specific compartments based on the detected data type. The transfer process further includes converting the data types of each raw data type specific compartment into a single data type so that each processed data type specific compartment has the same single data type. Then the processed data from each processed data type specific compartment is transferred to a temporary database where display rules are applied. The display rules are configured to define a format and content of a requested report. Next the requested report is outputted by referencing the temporary database and acquiring data elements from the temporary database using the display rules.

In another embodiment, a method for acquiring and transforming data for business analysis is disclosed. In this embodiment, the method identifies a set of data sources to be accessed. Then the raw data from each of the accessed set of data sources is loaded to raw data type specific locations. Next the integrity of the acquired raw data is verified. Then the acquired raw data from each of the raw data type specific locations is transformed to a uniform data type and then stored as processed data into processed data type specific locations.

In yet another embodiment, a method for acquiring and transforming data for business analysis is provided. In this embodiment, the method identifies a set of data sources to be accessed for a user, loads the raw data from each of the accessed set of data sources then verifies the integrity of the acquired raw data. Next the acquired raw data is transformed to processed data. The transformation process includes transferring the acquired raw data to a temporary database, converting the acquired raw data to a uniform format then applying processing rules to the converted raw data where the processing rules are configured to define processed data. Next the processed data is stored in a processed data type specific location from the temporary database. Next the processed data is transferred to a temporary database and display rules are applied where the display rules are configured to define a format and content of a requested report.

In still another embodiment, a method for acquiring and transforming data for business analysis is disclosed. In this embodiment, the method identifies a set of data sources to be accessed for a user, loads the raw data from each of the accessed set of data sources then verifies the integrity of the acquired raw data. Next the acquired raw data is transformed to processed data. The transformation process includes transferring the acquired raw data to a temporary database where the transfer is performed by a parallel memory map, converting the acquired raw data to a uniform format and then applying processing rules to the converted raw data where the processing rules are configured to define processed data. Next the processed data is stored in a processed data type specific location from the temporary database. Next the processed data is transferred to a temporary database and display rules are applied where the display rules are configured to define a format and content of a requested report.

In another embodiment, a method for retrieving, organizing and presenting data for business intelligence purposes is disclosed. In this embodiment the method locates a set of data sources containing raw data files. Next a time and frequency to access each of the set of data sources is set. Then the raw data files from the set of data sources is retrieved with the raw data files containing raw data. Next each of the retrieved raw data files is stored in a storage file. Then each of the retrieved raw data files is processed, where the processing includes loading each of the retrieved raw data files in a loader, where the loader contains a set of processing rules, and applying the set of processing rules to convert each of the retrieved raw data files to a processed data file having a uniform format. Next each of the processed data files is stored in the storage file. Then each of the processed data files are transferred to a database. Next the database is accessed in response to a customer report request. Next a report is presented in a desired format to the customer.

In yet another embodiment, a computer readable media having program instructions for acquiring and transforming data for business analysis is provided. One exemplary computer readable media includes program instructions for identifying a set of data sources to be accessed for a user. In addition, the computer readable media includes program instructions for loading raw data from each of the accessed set of data sources to raw data type specific locations. Additionally, the computer readable media includes program instructions for verifying the integrity of acquired raw data. In addition, the computer readable media includes program instructions for transforming the acquired raw data of each of the raw data type specific locations to a uniform data type, where the transformed acquired raw data is stored as processed data into processed data type specific locations.

The advantages of the present invention are numerous. Most notably, the methods for acquiring and presenting data for business analysis purposes efficiently extract, organize and present the data as requested by the customer. The conversion of the data to a uniform format allows for the centralization of the data thereby eliminating the need to continually access various data sources to provide requested reports. By automating the acquisition of the data through a data acquisition engine and storing incremental updates in a uniform format, the customer can be provided ad-hoc dynamic reports in real-time (e.g., in web database formats), thereby allowing for time sensitive and mission critical business decision to be made with all the current data at the executives fingertips. In addition, the utilization of temporary databases combined with parallel memory mapping transfers, minimizes the time required to retrieve and organize the data for presentation, in essence eliminating the need for teams of personnel to manually manipulate the data and both build and maintain costly, complex database systems. Furthermore, due to the uniform centralized format of the acquired data, the presentation of the data can be modified and re-presented in a fraction of the time as is currently available under the prior art. Finally, the presentation of the data can be customized to present a multi-dimensional display of the real world raw data enabling the customer a 360° view of what is happening with an organization.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 10 displays an exemplary presentation of an OLAP cube in accordance with one embodiment of the present invention.

DETAILED DESCRIPTION OF THE PREFERRED EMBODIMENTS

Figure 1:
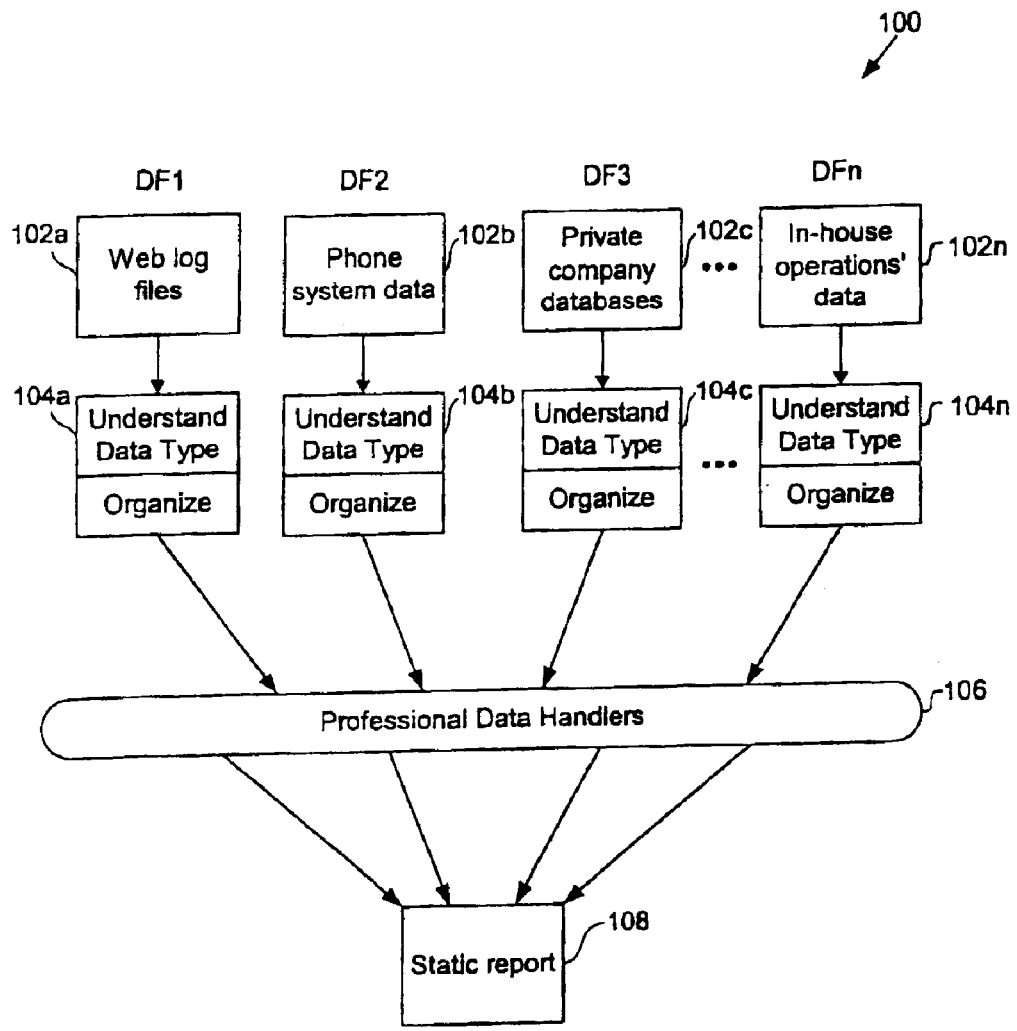
FIG. 1 illustrates an exemplary prior art method for acquiring and presenting data for business analysis.

An invention is described for the computer implemented methods for effectively extracting, organizing, uniformly formatting and presenting dynamic data for business intelligence purposes. It will be obvious, however, to one skilled in the art, that the present invention may be practiced without some or all of these specific details. In other instances, well known process operations have not been described in detail in order not to unnecessarily obscure the present invention.

In order to solve the problems of the prior art, the embodiments of the present invention provide computer-implemented methods that intelligently automate the extraction, organization, formatting and presentation of data from various data sources. Through the disclosed embodiments, on-line and off-line transaction data of varying data formats are capable of being integrated to provide a complete picture of a customer's business data. As used herein, a customer may be a company or organization that may need to capture information regarding its business units, its clients, its in-house operations, and related business transactions. In one embodiment, the features of the present invention may be incorporated into a globally networked service. A customer desiring such a service can therefore sign-up and subscribe over the network, and then commence usage of the services to perform the desired data analysis. It should be noted that the computer-implemented methods would therefore be executed on one or more computers and associated storage systems that are linked to the global network, such as the Internet. Of course, the network can also be in the form of a local area network, a wide area network, or even from a standalone computer having access to desired data sources.

In one embodiment, data from an in-house Enterprise Resource Planning (ERP) system for a customer can be combined with data concerning third party's use of the customer's web site and Interactive Voice Response (IVR) phone system to provide valuable information concerning the third party's buying practices and information needs (e.g., such as which pages were most accessed).

The above mentioned data is also valuable for a client's internal decision making. For example, the information gathered and presented by the methods of the present invention will assist a client in assessing the success of a sales/marketing campaign or which combinations of goods or services are popular with customers. More importantly, this data is presented in real-time, thereby overcoming the limitations of a prior art static report in a dynamic business environment. In addition, the data being assessed can be continually updated and presented in an incremental fashion. For example, sales data can be used to maintain a business' inventory and plan manufacturing campaigns to avoid any backorder situations. The dynamic reports of one embodiment of the present invention allow a business to continually monitor its operations in order to more efficiently manage its resources. It can be appreciated that numerous sales, marketing, financial and operations data can be analyzed and used for business intelligence purposes.

Presentation of the data can be two dimensional (e.g., using spreadsheets or tables) or multi-dimensional (e.g., using cubes). In one embodiment of the invention a cube can be presented as summaries of a defined data set through an online analytical processing (OLAP) system. An OLAP data cube can be presented as a multi-dimensional cube representing any number of descriptive categories or business metrics (dimensions) and quantitative values (measures). An example of a dimension could be a time dimension such as the number of visits to a web site in a day, week month or year time frame, while a measure could be the number of times a Uniform Resource Locator (URL) has been viewed (page-views), the number of times a URL has been used as an entry page (entrance) or the number of times a URL has been used as an exit page (exit). A multidimensional cube can be presented using the above mentioned dimensions and measures in order to view the data from different points of view and possibly discover previously undetected relationships between the data items. OLAP software can locate the intersection of dimensions and display them For example, a newspaper company such as the www.samplecompany.com may learn that of all the visitors to its web site over the previous quarter (dimension) 80% of the visitors initially open the politics page (measure) and then 70% of the same visitors move to the sports page (measure). This data can be used to make business decisions including what type of ads to place on the web site, where to locate the ads and how to make navigation of the web site easier for the most frequent users. It should be appreciated by one skilled in the art that an OLAP data cube can be constructed through any number of dimensions and measures.

Figure 2:
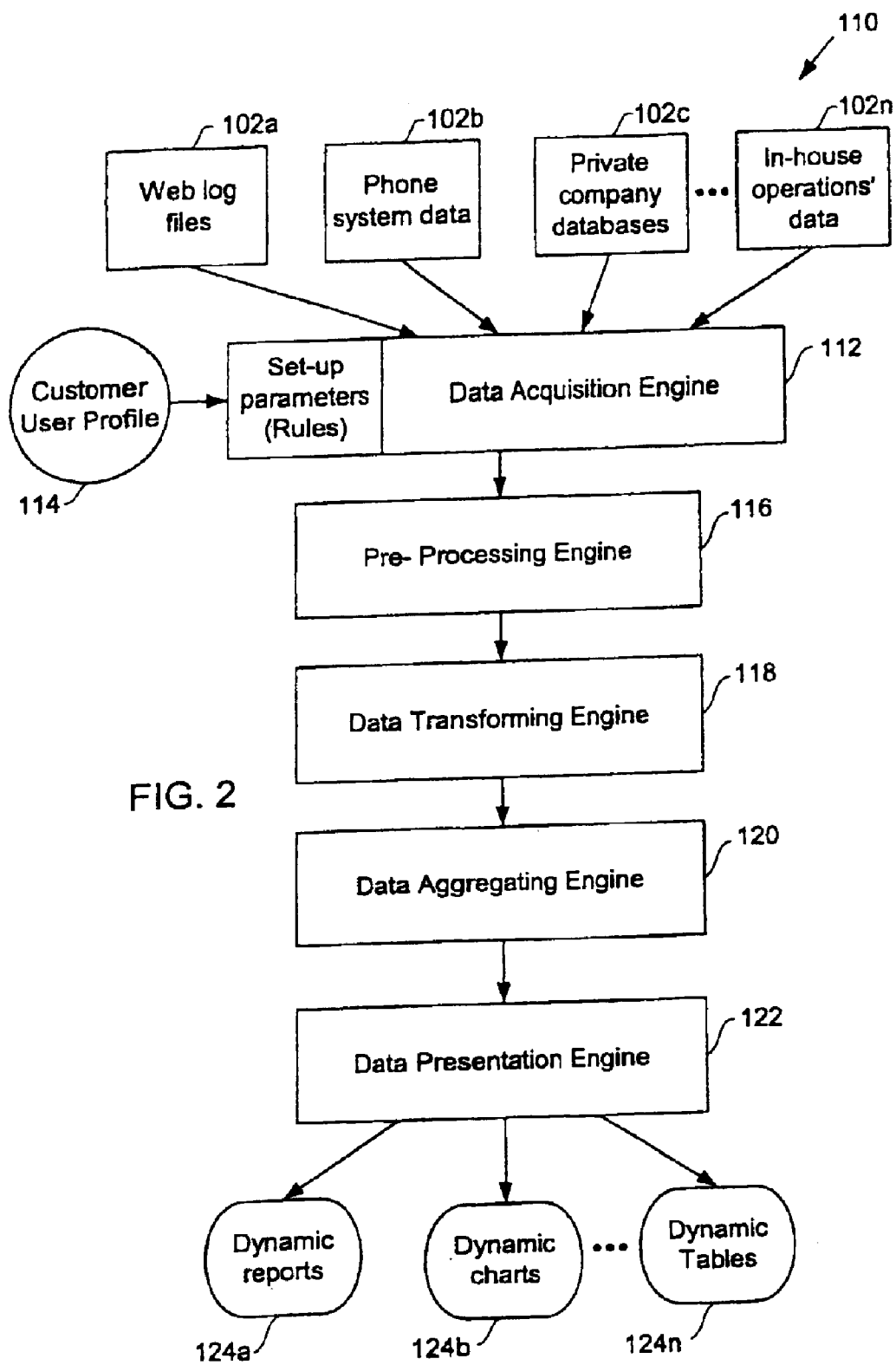
FIG. 2 shows a flowchart defining an overview of a method for acquiring and presenting data for business intelligence purposes, in accordance with one embodiment of the present invention.

FIG. 2 shows a flowchart 110 defining an overview of a method for acquiring and presenting data for business intelligence purposes in accordance with one embodiment of the present invention. It should be understood that the method depicted in the flowchart 110 may be in a program instruction form written and stored on any type of computer readable media. For instance, the program instructions can be in the form of software code developed using any suitable type of programming language. For completeness, the method of FIG. 2 will illustrate an exemplary process whereby a desired report may be generated and displayed through the acquisition and organization of the data acquired from the various sources. It should be noted that the method of FIG. 2 is a high level overview of the method and will be explained in more detail in reference to later figures.

As mentioned previously, a number of sources contain data that businesses would find useful if the data is organized and presented effectively. Various data sources are represented in FIG. 2 such as web files 102a, phone system data 102b, private company databases 102c and in-house operation's data 102n. It can be appreciated that other data sources that contain data useful for business intelligence can be identified such as web user registration data, point of sale data, product inventory data, etc. As mentioned above, the various data sources consist of varying data formats. For example, one skilled in the art would appreciate the varying types of web log files such as world wide web consortium (W3C), Internet Information Server (IIS), APACHE-type web log files, etc.

In initial operation 112, a data acquisition engine acquires the desired data from the various data sources. The data acquisition engine is controlled by a Continuous Object Progression (COP) program. The COP contains rules followed by the data acquisition engine. The COP will be explained in more detail in reference to FIG. 3. The data acquisition engine will read the data source and request the acquisition of the data. If an error is detected, the rules may specify that a process be repeated. In one embodiment, each file of the data acquired in operation 112 is stored in an individual storage file as raw data. As used herein, raw data refers to data in the acquired format that has not been modified from its initial format that was defined by its source. The identity and location of the various data sources for operation 112 are defined through the set-up parameters as are the time and frequency to access the desired data sources.

The set-up parameters originate from operation 114, wherein customer user profile data is provided to the computer implemented system. The customer user profile is defined by the customer and integrated into operation 112. The customer user profile can be generated from a menu driven user interface which follows an interview format. For example, a wizard similar to those used in the set-up of popular desktop software programs may be employed. In addition to the identity, location, time and frequency mentioned above, the customer user profile will extract the necessary set-up information including but not limited to the type of service level (e.g., premium or standard), billing instructions for the service and passwords to obtain the specified data from the data sources. The customer user profile may also specify the primary and secondary data centers located in close proximity to the customer. For efficiency purposes the geographically closest data center is typically chosen as a primary data center. Examples of such data centers can be separately managed by professional data storage centers. Example companies that provide these services may be QWEST Communications International, Inc. of Denver, Colo., and EXODUS Communications, Inc. of Santa Clara, Calif.

After operation 112, the method proceeds to operation 116, where a pre-processing engine operates on the acquired data in each individual storage file to verify the integrity of the data. According to rules contained and managed by the COP, operation 116 ensures that the desired data is inside each type of file acquired in operation 112. In addition, operation 116 will open each file to verify that the acquired data file will open.

Continuing with the high level discussion, the method then advances to operation 118 where a data transforming engine converts the pre-processed data from the various data sources and varying data formats to a uniform format. The data transforming engine will identify and open each file of the pre-processed acquired data (also referred to as acquired raw data) from each individual storage file, memory map each file into a temporary database according to processing rules of the COP, convert the data to a uniform format and return each file of the processed data to a storage file. In a preferred embodiment the mapping to the temporary database is a parallel memory map so as to improve performance and speed of the data transfers. In operation 118 rules are applied to the files in the temporary database to parse the data in order to eliminate unnecessary information contained in the files or modify information. For example, web log files may contain information that may not be relevant to the data requested by the customer in the customer user profile 114 and may be discarded according to the rules in the COP. Each file of the parsed and converted data from the temporary database is transferred to storage file locations as processed data.

After operation 118, the method then proceeds to operation 120 where a data aggregating engine organizes the processed data from operation 118 for presenting a desired report. Each of the files of the processed data in the storage file is transferred to a temporary database. In a preferred embodiment the transfer is performed by a parallel memory map. The format of the report is defined by the customer as part of the customer's user profile. Operation 118 contains functionality for a customer to modify an existing report format or create a new report format. Modification of an existing report or creation of a new report format can be accomplished through a menu driven interview format as described with respect to operation 114, or using any other common techniques, such as drop-down menus, selection buttons, or other graphical or non-graphical interactions. The OLAP system as described above may be used to modify or generate a report. In addition, the assignee uses report generators referred to as "Report Library" and "Query Wizard" in order for the customer to modify or create a report from the data in the customer web database.

The processed data in the temporary database is organized and placed in the proper format for the requested report. Display rules controlled by the COP specify the organization and format of the processed data in the temporary database in order for a report generator to efficiently process and present the data.

The method then proceeds to operation 122 where a data presentation engine will take the organized and formatted processed data from operation 120 and display the data as a report for the customer to view, interact with, or modify its presentation format so as to gain the most useful desired information. One skilled in the art can appreciate that the reports can be displayed in a number of formats including but not limited to reports, charts, tables or any combination thereof. In a preferred embodiment, the reports are dynamic reports. In another preferred embodiment, the reports are in a world wide web interactive format (e.g., HTML, XML, Java™, etc.). Still further, the customer can specify, through the customer user profile, to receive the reports at set times and frequencies. One skilled in the art can appreciate that the mechanism of presentation of the reports to the customer can occur through a number of readily available modes, such as logging on to a web browser enabled computer or device (whether connected to a network or by a wireless link), electronic messaging (e.g., electronic mail), and the like. For illustration purposes, a set of example dynamic reports, charts, and tables, 124a, 124b, 124n, respectively, are illustrated herein. Accordingly, once the data has been acquired from the various sources of varying formatting and type, processed and transformed into a uniform format, the dynamic interfaces can act on the data uniformly. This uniform interaction will thus enable a user to truly capture the full power of the data so as to enable a comprehensive view and analysis. This rich analysis will thus enable customers to quickly make critical business decisions using the latest information.

Figure 3:
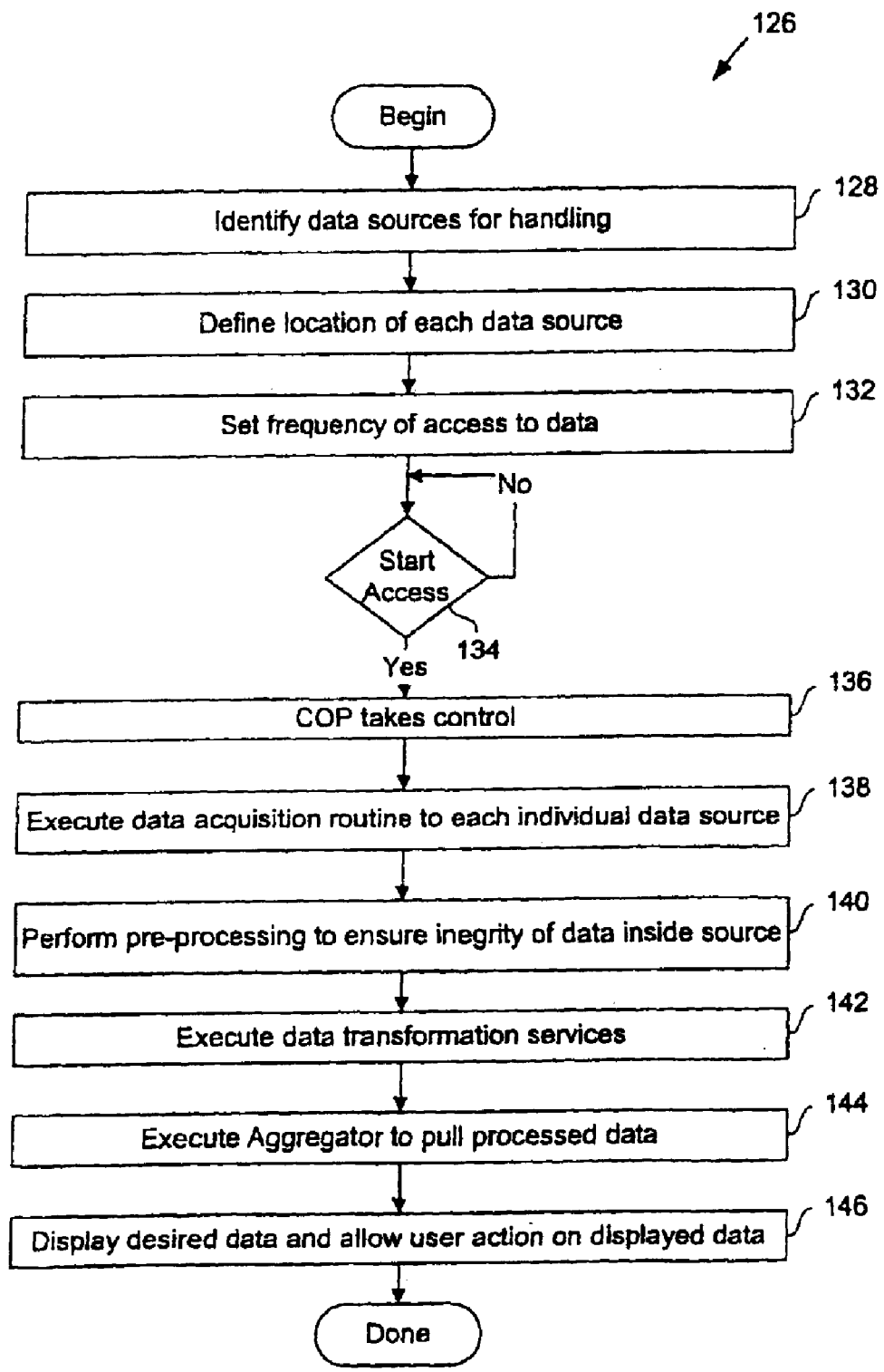
FIG. 3 shows a flowchart depicting a method for acquiring and presenting business data in accordance with one embodiment of the present invention.

With the overview in mind, FIG. 3 shows a flowchart 126 depicting a method for acquiring and presenting business data in accordance with one embodiment of the present invention. In initial operation 128 data sources for handling data for the customer are identified. As mentioned previously, the customer specifies the data sources in operation 114. The customer may use a menu driven user interface to identify the data sources. The data sources can include data source web log files 102a, phone system data 102b, private company data 102c or in-house operation's data 102n. Other example data sources can include web user registration data, point of sale data, product inventory data, etc. It should be appreciated that any data source containing information useful for business intelligence purposes may be identified.

From operation 128 the method proceeds to operation 130 where a location of each data source is defined. The location of each data source will define the path the data acquisition engine 112 will use to access the data source. The location of each data source is entered by the customer as part of operation 114. It should be realized that any passwords or routines necessary to access the data sources will be supplied from operation 114 as mentioned above. It should also be noted that the methods of retrieval of the data from the data source will be dictated by the location of the data source. One skilled in the art will appreciate the available methods of retrieval of files are many. Some examples may include file transfer protocol (FTP), Secure shell (SSH), hyper text transfer protocol (HTTP), hyper text transfer protocol over secure socket layer (HTTPS), etc.

From operation 130 the method proceeds to operation 132 where a frequency of access to the data is set. The frequency of access to the data is set by the customer in operation 114. It should be noted that the customer can specify any frequency that is useful for business intelligence purposes.

After operation 132 the method proceeds to operation 134 where the COP checks if it is the correct time to begin accessing the data from the data sources. If it is not the correct time to begin accessing the data, the program will continue to check until it is the correct time to access the data sources. If it is the correct time to commence accessing the data from the data sources the method proceeds to operation 136.

In operation 136 the COP takes active control of the program interaction. The COP will control the timing and control of the program operations to efficiently move data traffic and schedule tasks. In addition, the COP controls the rules for the operations performed in the method. The COP can be viewed as a master scheduler in that it directs all data traffic to perform the operations to accomplish the process in the most efficient and effective manner possible. As used herein, COP refers to any program or piece of code that manages the system operations and software components thereof. Accordingly, the method described herein is subject to the control and rules of the COP, as the COP directs all data traffic of the system.

From operation 136 the method proceeds to operation 138 where the execution of the data acquisition routine initiates. In operation 138 the COP initiates the data acquisition process and schedules the acquisition of the data from the various data sources. Once the data has been acquired by the data acquisition engine, the COP is notified of the acquisition of the data and the COP will verify the successful acquisition of the data. If the acquisition of the data is not successful, the COP will reinitiate the request for the data acquisition from the specified data source. Operation 138 will be explained further in reference to FIG. 4A.

After the successful acquisition notice to the COP the method proceeds to operation 140 where pre-processing to ensure the integrity of the acquired data is performed. Operation 140 will ensure each file opens. Additionally, operation 140 will perform a predetermined process based on the type of file acquired (e.g., log file, Excel™ file, wireless application protocol (WAP) file, etc.) to ensure the data is inside each type of file. If an error is detected, the COP will request to retransfer the data from the appropriate data source. If the integrity of the data is verified, each file of the acquired raw data will be stored in a storage file location. Operation 140 will be explained further in reference to FIG. 5.

Upon successful completion of operation 140, the method advances to operation 142 where the data transformation services (DTS) are executed. Each file of the raw data stored in operation 140 is transferred to a temporary database. The transferring is preferably by way of a memory map that moves the raw data to the temporary database where it is transformed into processed data following processing rules for the type of data source as managed by the COP. Each file of processed data in the temporary database is then transferred to a storage file location. In a preferred embodiment the transfer is performed by a parallel memory map. Operation 142 will be explained further in reference to FIG. 6.

After operation 142 the method proceeds to operation 144 where the aggregator to pull the processed data is executed.

Operation 144 transfers the files of processed data from the storage file locations to a temporary database. Display rules are applied in order to get the desired report or data set requested by the customer. Each file of the processed display data in the temporary database is then transferred to a storage file location. In a preferred embodiment the transfer is performed by a parallel memory map. Operation 144 will be explained further in reference to FIG. 8

After operation 144 the method proceeds to operation 146 where the desired data is displayed and the user is allowed to take action on the displayed data. Each required file of the processed display data stored in the storage file is accessed and transferred into a desired format for the reports requested by the customer. As mentioned previously, the customer can specify the format of the reports, the frequency of the reports and the mechanism for receiving the reports. In addition, the customer can interact with or modify the report presentation so as to extract the most useful information from the data.

Figure 4A:
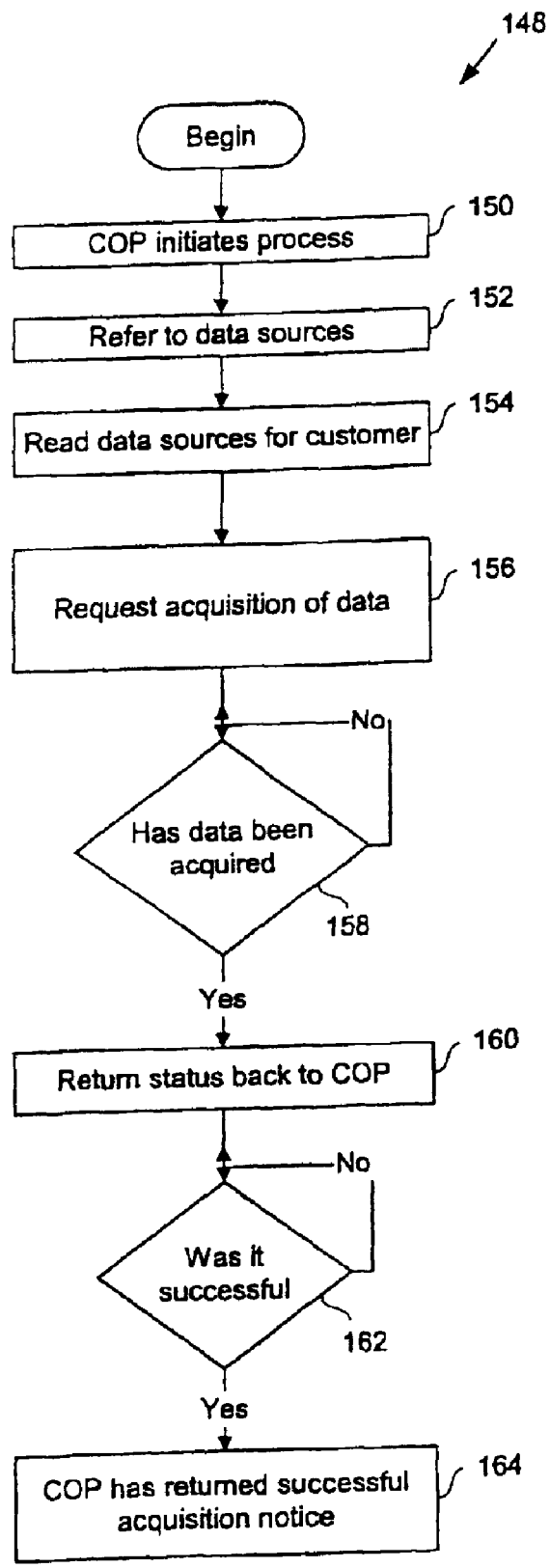
FIG. 4A displays a flowchart defining a more detailed description of the data acquisition routine in accordance with one embodiment of the present invention.

FIG. 4A displays a flowchart 148 defining a more detailed description of the data acquisition routine in accordance with one embodiment of the invention. Flowchart 148 commences with operation 150 where the COP initiates the data acquisition routine. The time and frequency of acquiring the data from various data sources is defined by the customer user profile. Accordingly, the COP schedules the data acquisition routine as specified in the customer user profile. The method then proceeds to operation 152 where the data acquisition engine refers to and accesses the data sources. The identity, access routines, source path and passwords if required, for the various data sources are defined in the customer user profile. The data acquisition engine utilizes the defined source path to locate the various data sources. In a preferred embodiment of the invention the data acquisition engine is referred to by the Assignee of this application as a "NITE CRAWLER™" data acquisition engine. Next, the method proceeds to operation 154 where the COP requests the data acquisition engine to read the data source. As mentioned above, the data sources are defined by the customer user profile. After operation 154, the method advances to operation 156 where the COP requests that the data acquisition engine acquire the data from the data source(s). Here the desired data, as specified by the customer in the customer user profile, is captured by the data acquisition engine. The method continues to operation 158 where the data acquisition engine checks whether the data has been acquired. If the data has not been acquired, the system will wait for a period of time and re-check if the data has been acquired. This re-check may be repeated for a number of times. If the data has not been acquired after a set number of re-checks (e.g., 3 times), an error message may be generated. If the data has been acquired, the method advances to operation 160 where the data acquisition engine returns the status back to the COP. Next, operation 162 proceeds where the COP verifies that the data acquisition was successful. For example, the COP, which refers to any program or piece of code that manages the system operations and software components thereof, may check that the source of the data specified in the customer user profile and the destination from which the data was acquired by the data acquisition engine are the same. If the data acquisition was not successful, the COP may reinitiate a request for acquisition of the data. The request to reinitiate acquisition of the data can be repeated for a set number of times. If the data has not been successfully acquired after a set number of requests to reinitiate acquisition of the data, the COP may return an error message. If the acquisition of the data is successful, the method sends a notice to the COP indicating success.

Figure 4B:
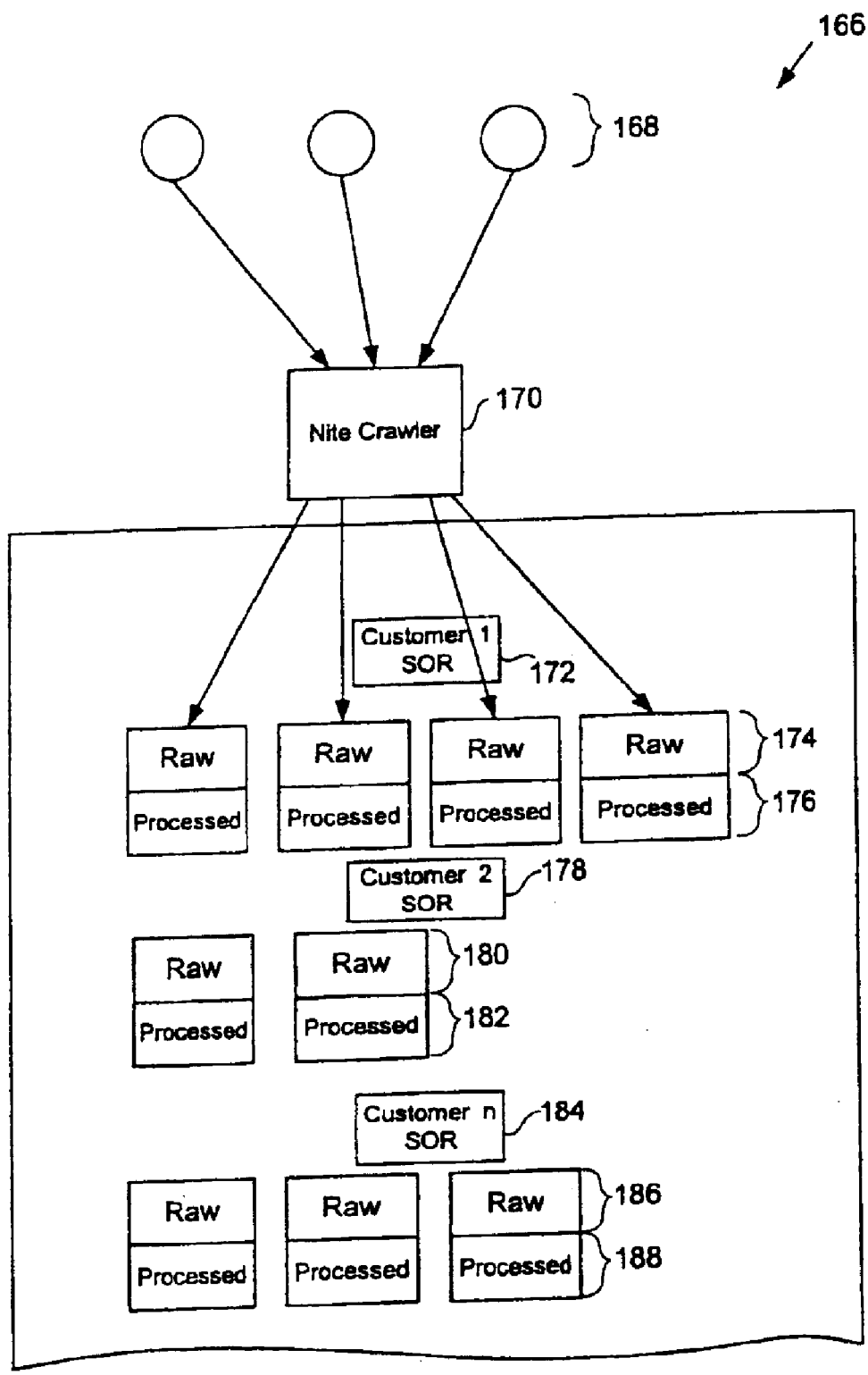
FIG. 4B is a block diagram illustrating the arrangement of the acquired raw data, processed data, and suite of rules (SOR) associated with each customer in accordance with one embodiment of the present invention.

FIG. 4B is a block diagram 166 illustrating the arrangement of the acquired raw data, processed data, and suite of rules (SOR) associated with each customer in accordance with one embodiment of the invention. Block diagram 166 depicts the raw data 168 from the various data sources. As described in FIG. 4A the raw data 168 is acquired by the data acquisition engine 170. As defined above, raw data refers to the acquired data that has not been modified from its initial format that was defined by its source. The data acquisition engine 170 distributes the successfully acquired data to flat file compartments according to the suite of rules for a customer. For example, the acquired raw data for customer 1 is distributed by the data acquisition engine 170 according to a customer 1's SOR 172 as dictated by the COP into flat file compartments and stored as raw data 174. In a preferred embodiment of the present invention the flat file compartments may be contained in a network attached storage (NAS) system, or any other storage media, whether networked or not. The storage of the acquired raw data may be repeated for a number of customers. For example, the raw data 168 may be distributed by the data acquisition engine 170 according to customer's 2 SOR 178 or customer n's SOR 184 to flat file compartments and stored as raw data 182 and 188, respectively. The process of converting the stored raw data to processed data will be explained more fully in reference to FIG. 7. It can be appreciated that any number customers with varying compartments of raw data can be created.

Figure 5:
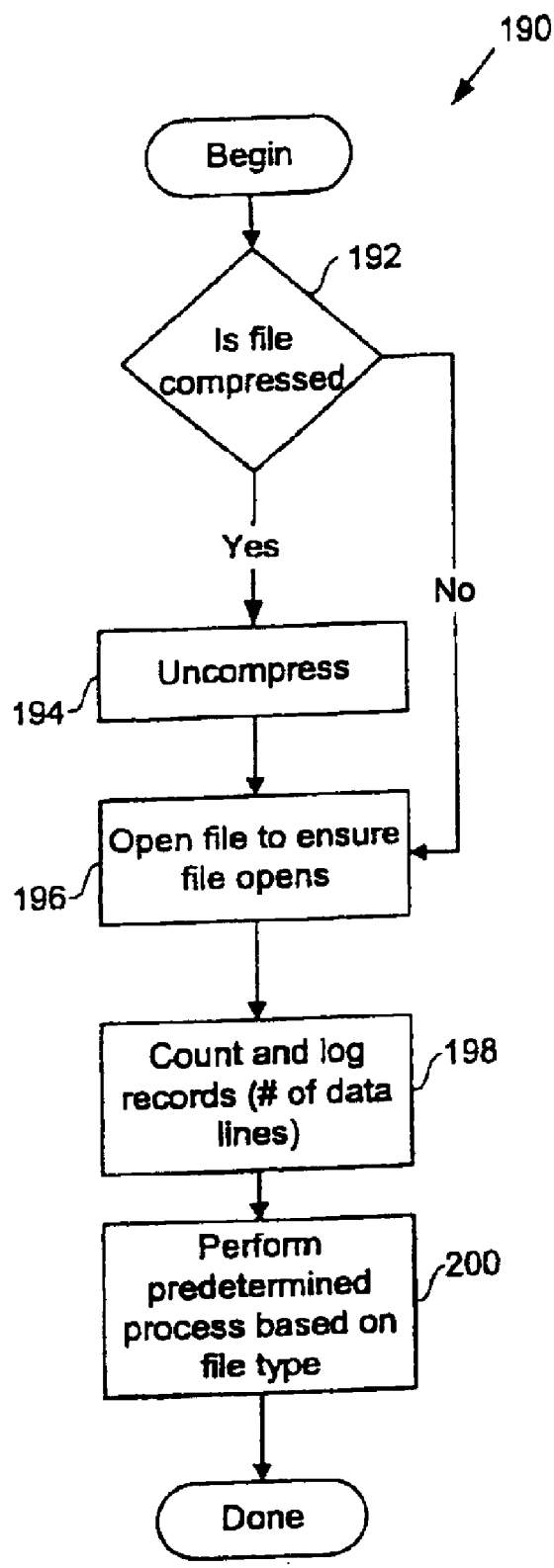
FIG. 5 depicts flowchart defining a more detailed description of the pre-processing method to ensure data integrity in accordance with one embodiment of the present invention.

FIG. 5 depicts flowchart 190 defining a more detailed description of the pre-processing method to ensure data integrity in accordance with one embodiment of the invention. Flowchart 190 initiates with operation 192 where the raw data stored in the flat file compartment is checked to see whether the raw data file is compressed. If the raw data file is not compressed the method advances to operation 196 where the raw data file is opened. If the raw data file is compressed the method advances to operation 194 where the raw data file is uncompressed. For example, if the raw data file is compressed as a zip file the raw data file will be unzipped according to rules dictated by the COP. After the raw data file is uncompressed the method proceeds to operation 196 where the raw data file is opened. Operation 196 opens the raw data file to verify that the file opens. If the raw data file can not be opened the COP may reinitiate a request to the data acquisition engine to reacquire the data from the data source. If the raw data file can be opened the method advances to operation 198 where the lines in the file are counted and recorded. If the opened raw data file can not be counted the COP may reinitiate a request to the data acquisition engine to reacquire the data from the data source. The method then terminates with operation 200, where a predetermined process is performed based on the type of file being opened in operation 196. The predetermined process may consist of opening the file and performing an operation on the data contained in the file to verify the integrity of the data in the opened file. Accordingly, depending on the type of file (i.e., log file, user registration file, Excel™ file, etc.), the COP will perform different operations to ensure data integrity.

Figure 6:
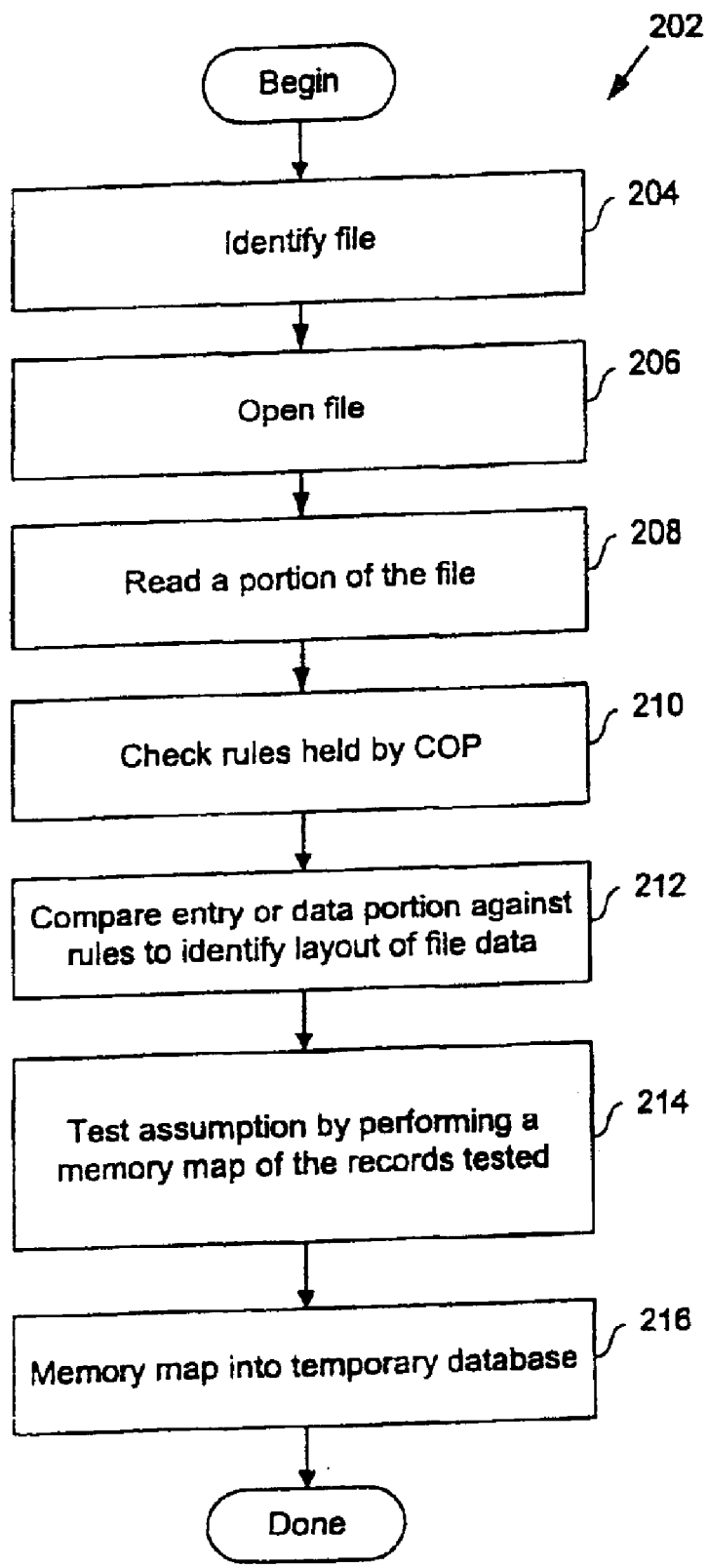
FIG. 6 displays flowchart defining a more detailed description of the data transformation services (DTS), in accordance with one embodiment of the present invention.

FIG. 6 displays flowchart 202 defining a more detailed description of the data transformation services (DTS), in accordance with one embodiment of the present invention. Flowchart 202 initiates with operation 204 where the raw data files to be processed are identified. As defined above, raw data refers to the acquired data that has not been modified from its initial format that was defined by the data source from which the raw data originated. Presently, the raw data from the different sources are separately stored in their respective compartments (e.g., storage locations). The method then advances to operation 206 where the identified file is opened. Here, a format detector will detect the file type so that the file may be opened according to rules dictated by the COP. After operation 206, the method proceeds to operation 208 where a portion of the opened file is read. The method then advances to operation 210, where the rules for identifying the layout of the file data in the COP are checked. From operation 210, the method proceeds to operation 212 where the entry or data portion read in operation 208 is compared to the COP rules checked in operation 210. The method then advances to operation 214 where the assumed layout of the file data is verified performing a memory map of the records tested. If the wrong number of records is found then the assumption is wrong and the COP will perform a manual format detection. If the number of records is correct then the method terminates with operation 216 where the raw data files identified in operation 204 are memory mapped into a temporary database. In a preferred embodiment of the invention the memory map is performed by a parallel memory map. This parallel memory map thus avoids the time consuming method of transferring data record by data record, as is common in the prior art.

Figure 7:
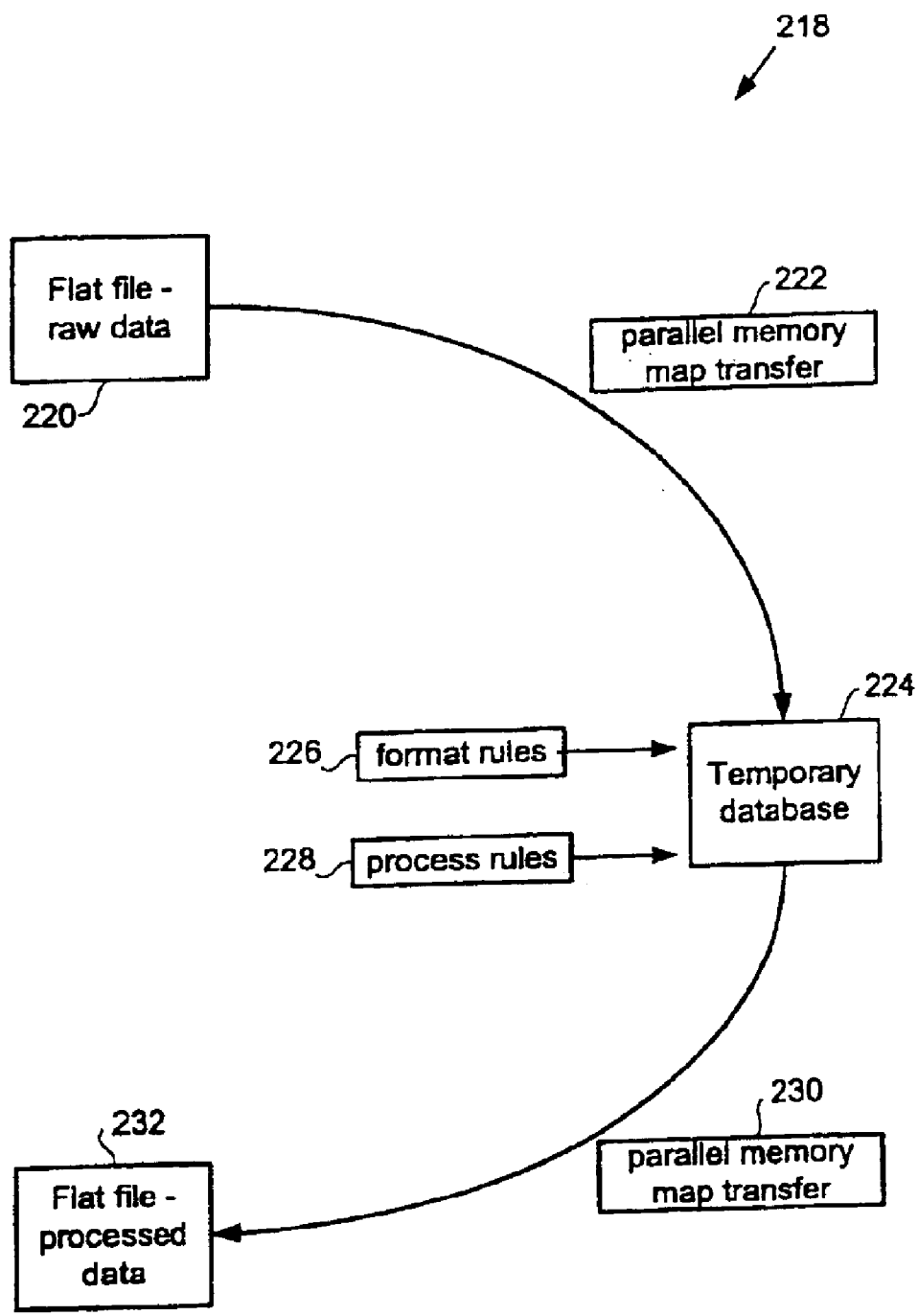
FIG. 7 is a block diagram illustrating the transformation of raw data into processed data in accordance with one embodiment of the present invention.

FIG. 7 is a block diagram 218 illustrating the transformation of raw data into processed data in accordance with one embodiment of the invention. FIG. 7 illustrates raw data 220 contained in a flat file. As defined above, raw data refers to data in the acquired format that was defined by the data source from which the raw data originated. The raw data is transferred to a temporary database 224 under the direction of the COP. In a preferred embodiment of the invention, the transfer is a parallel memory map transfer. In the temporary database 224, format rules 226 and process rules 228 are applied to the transferred raw data files to transform the raw data to processed data. The temporary database may be in a loader as described in reference to FIG. 14 in accordance with one embodiment of the invention. In a preferred embodiment of the invention, the format rules 226 and process rules 228 convert the data to a uniform format. The uniform data in temporary database 224 is transferred as processed data 232 to flat file storage compartments under the direction of the COP. In a preferred embodiment of the invention, the transfer is a parallel memory map transfer 230. In another preferred embodiment of the invention, the raw data 220 and the processed data 232 are stored in a NAS system. It can be appreciated that the conversion of raw data to processed data can be performed for multiple raw data files for the same customer and for multiple customers as illustrated in FIG. 4B.

Figure 8:
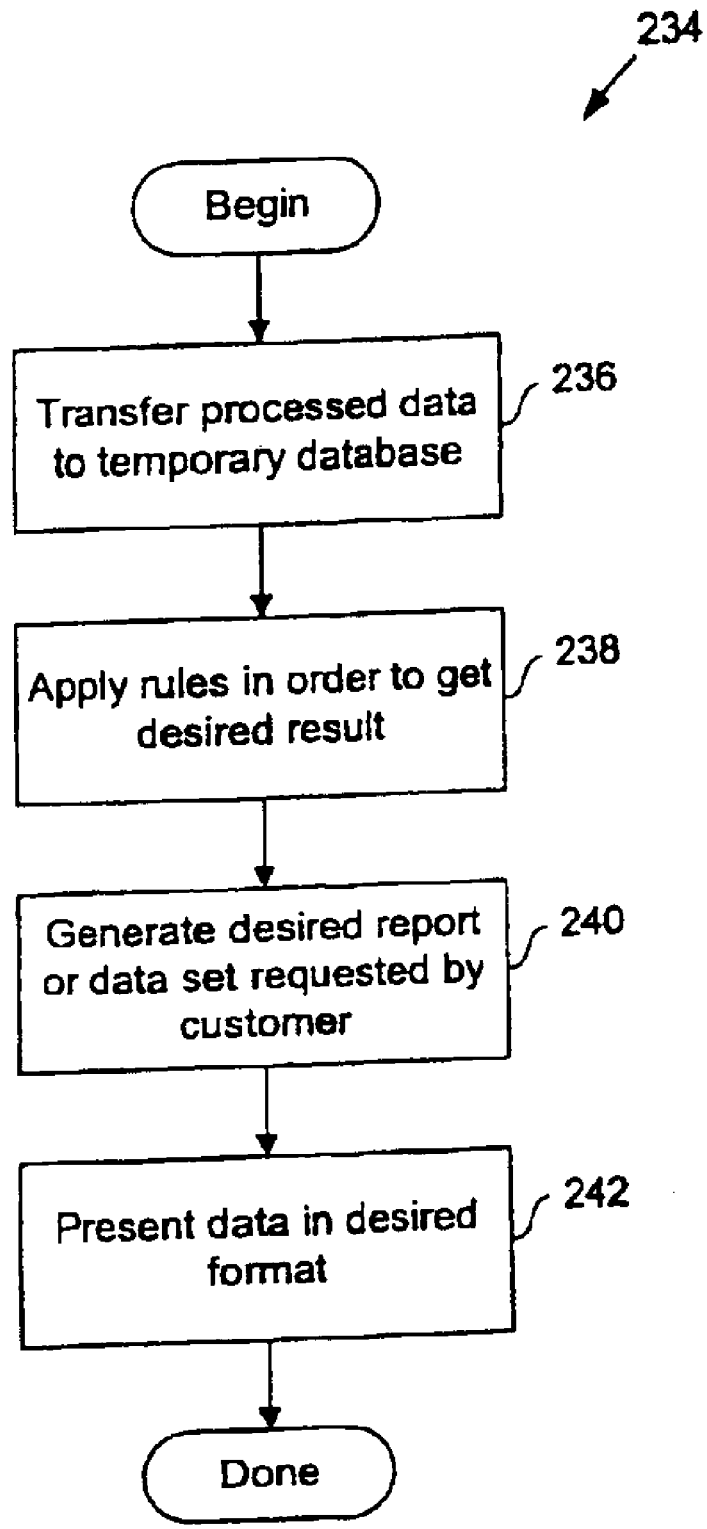
FIG. 8 displays a flowchart which describes in more detail the aggregator execution to pull the processed data for presentation in accordance with one embodiment of the present invention.

FIG. 8 displays flowchart 234, which describes in more detail the aggregator execution to pull the processed data for presentation in accordance with one embodiment of the invention. Flowchart 234 initiates with operation 236 where the processed data stored in flat files is transferred to a temporary database. In a preferred embodiment of the invention, the transfer is a parallel memory map transfer. Next, the method advances to operation 238 where rules are applied to the data in the temporary database to obtain the desired results. Here, the rules applied to the data in the temporary database may include business rules, data mining rules or display rules. After applying the business rules, data mining rules and/or display rules to the processed data in the temporary database, the processed data is transformed to display data. After operation 238 the method proceeds to operation 240 where the desired report or data set requested by the customer is generated. The customer defines the desired report or data set in the customer user profile. The method then terminates with operation 242 where the data is presented in the desired format. Here, the data may be presented as a dynamic report, a chart, a table, a dynamically modifiable file, or any other format. In addition, the customer may be presented with options to modify the data presentation or contents. For example, the customer may want to view multiple business metrics displayed in a various reports, charts or tables as an OLAP cube in order to scrutinize the data for undetected relationships.

Figure 9:
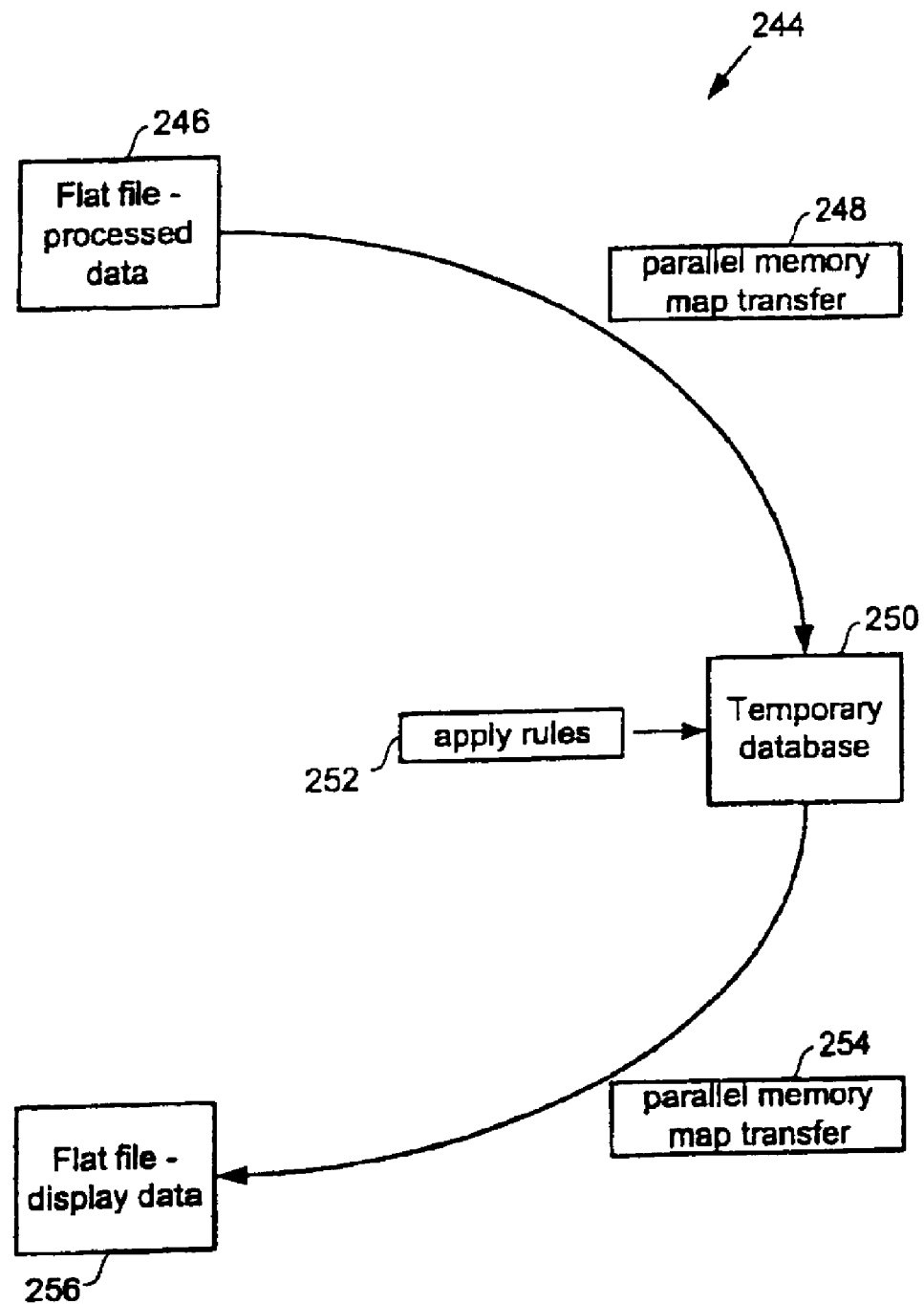
FIG. 9 is a block diagram illustrating the transformation of processed data into display data in accordance with one embodiment of the present invention.

FIG. 9 is a block diagram 244 illustrating the transformation of processed data into display data in accordance with one embodiment of the invention. FIG. 9 illustrates processed data 246 contained in a flat file. The processed data is transferred to a temporary database 250. In a preferred embodiment of the present invention, the transfer is a parallel memory map transfer 248. In the temporary database 250, rules 252 are applied to the transferred processed data as dictated by the COP. These rules may include business rules, data mining rules and/or display rules. The rules convert the processed data to display data 256. The display data 256 in the temporary database may be transferred to flat file storage compartments. In a preferred embodiment of the present invention, the transfer is a parallel memory map transfer. In another preferred embodiment of the present invention, the display data 256 in a flat file storage compartment is contained in a NAS. The display data 256 stored in the flat file storage compartment may be displayed on demand by the customer. For example, the customer may be capable of logging into a network to access the display data. Once the customer is logged into the network, which may require supplying a password, the customer can access the dynamic reports as defined by the customer user profile.

Accordingly, the customer can decide which report to view by making the proper selection from a screen menu or graphical user interface. Once the customer makes his selection, the report can be instantaneously presented by accessing the display data in the flat file storage compartments. In addition, the customer can modify the data presentation or data contents. For example the customer may desire to present the data in an OLAP cube in order to examine multiple business metrics for previously undetected relationships. It can be appreciated that the display data can be presented directly from the temporary database as described in FIG. 8.

FIG. 10 displays an exemplary presentation of an OLAP cube in accordance with one embodiment of the invention. As discussed above, the data can be presented and displayed in many forms, such as two dimensional and dynamic charts, tables, spreadsheets, lists, graphical representations, audio clips, etc. Continuing with the example of FIG. 10, an OLAP cube displays a multi-dimensional, multi-measure presentation for identifying corollary and causal relationships. The dimensions of the OLAP cube presented in FIG. 10 consist of the columns titled "Country", "visit year", "visit month" "visit week" and "visit day". The measures of the OLAP cube of FIG. 10 consist of the columns titled "Pageviews", "Entrances", "Exits" and "Singles". As used herein a single refers to the number of times a URL has been used as a single pageview; serving both as an entry and exit page. While the data presented in FIG. 10 refers to country data and time values for dimensions and web site traffic for measures, it is understood that any number of descriptive categories or business metrics (dimensions) and quantitative values (measures) may be used. It can be appreciated that the OLAP tool enables analysts, managers and executives to gain insight into data through fast, consistent, interactive access to a wide variety of possible views of information that has been transformed from raw data to reflect the real dimensionality of the enterprise as understood by the user.

In addition, since the presentation is interactive, the user is able modify the presentation of the data through clicking and dragging techniques, drag and drop functionality, pull down menus, graphical user interface, etc. The display data used to populate the OLAP cube is easily accessed and optimized for rapid ad-hoc information retrieval in an orientation, as well as for fast, flexible calculation and transformation of raw data based on formulaic relationships. Accordingly, any queries made by the user to include data in the presentation, that is not currently filed as display data, can be quickly accomplished by accessing the raw data and transforming it to display data as described above. The COP will manage the accessing and transforming of the raw data is performed as efficiently as possible and so as to not disrupt any previously scheduled events. It can also be appreciated that under the direction of the COP, the presentation can be displayed in real time by continually accessing and updating the raw data used to populate the cube or any other presentation.

Figure 11:
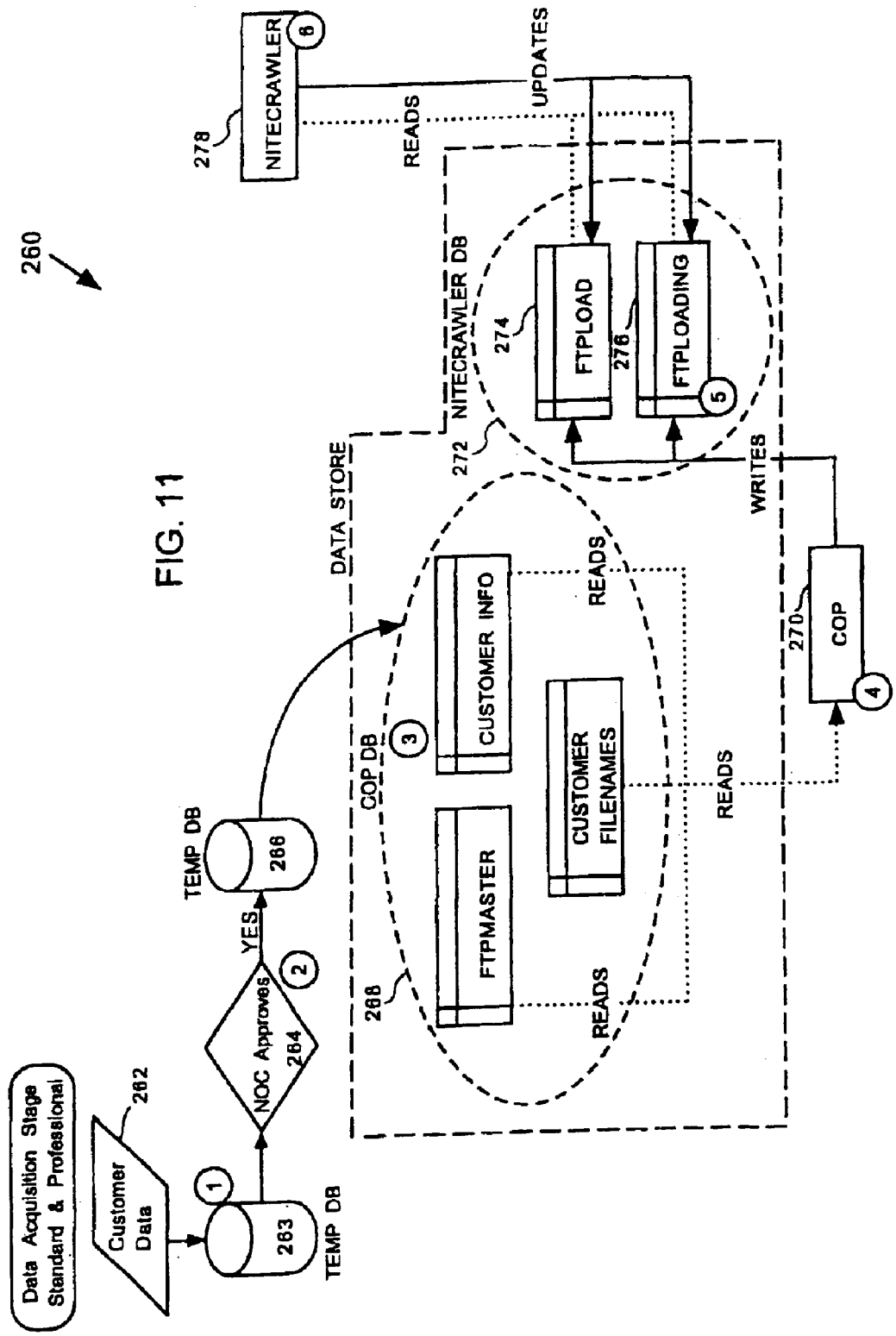
FIG. 11 is a block diagram which describes the data acquisition stage for standard and professional subscriptions in accordance with one embodiment of the present invention.

FIG. 11 is block diagram 260, which describes the data acquisition stage for standard and professional subscriptions in accordance with one embodiment of the invention. Block diagram 260 illustrates customer data 262. As described above the customer inputs data as part of the customer user profile. The customer data 262 may be stored in a temporary database 263. The Network Operations Center (NOC) 264 approves the data inputted by the customer. If the NOC does not approve the data, the customer is prompted to re-enter the data. If the NOC approves the data, the data may be stored in temporary database 266. Next, the information is written to files in the COP database 268. The COP 270 then reads the information from the files and determines what customer is associated with the files. The COP 270 then schedules the files to be downloaded by the data acquisition engine and writes these entries to data table 1, 274 and data table 2, 276 in the data acquisition engine database 272. Data tables 1 and 2, 274 and 276, respectively, may contain lists of jobs for the data acquisition engine 278 to perform. Block diagram 260 terminates with the data acquisition engine 278 locating the various data sources as scheduled by the COP and as described in reference to FIG. 4A.

Figure 12:
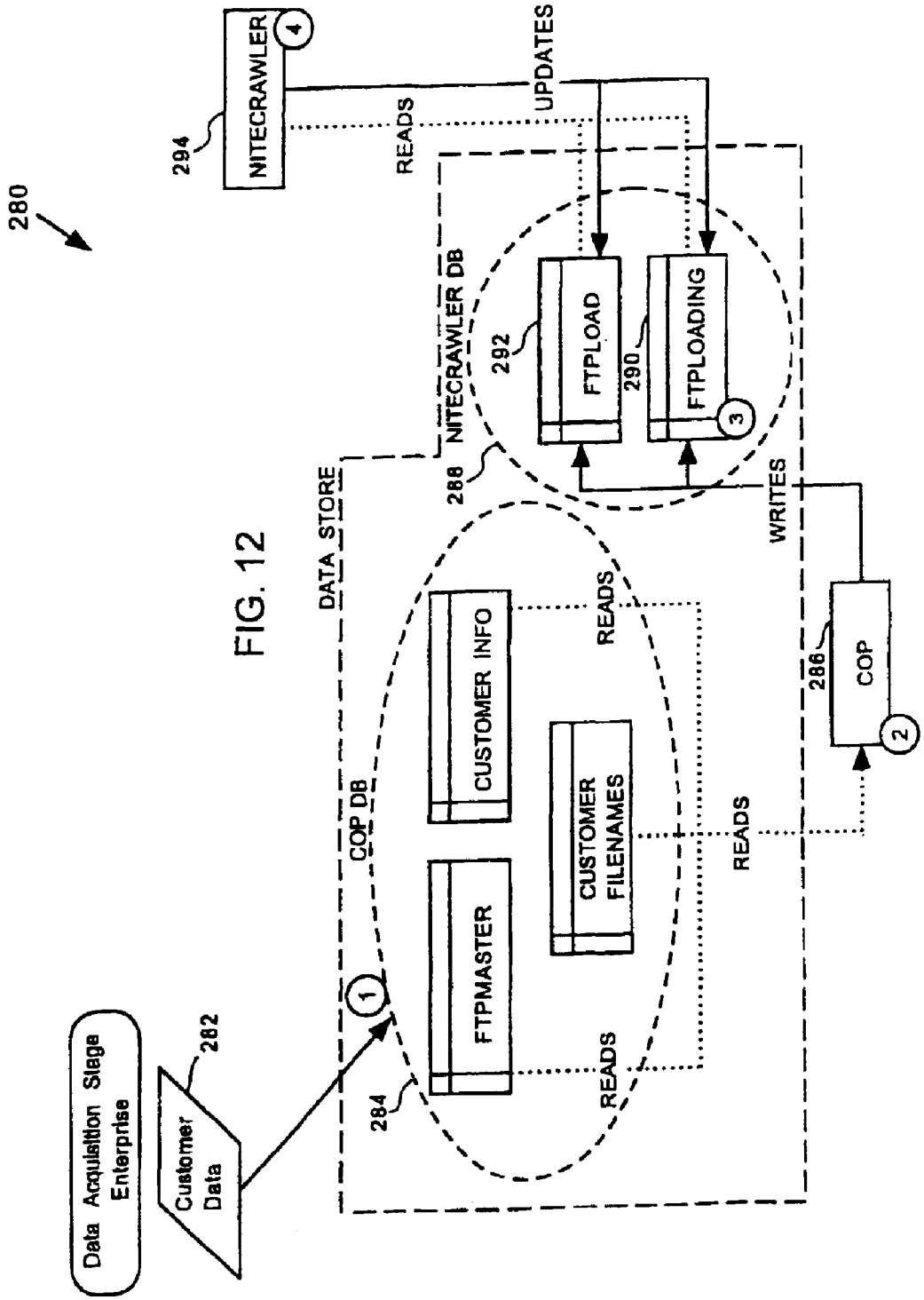
FIG. 12 is a block diagram which describes the data acquisition stage for enterprise subscriptions in accordance with one embodiment of the present invention.

FIG. 12 is block diagram 280 which describes the data acquisition stage for enterprise subscriptions in accordance with one embodiment of the invention. Block diagram 280 illustrates customer data 282. As described above the customer inputs data as part of the customer user profile. The customer inputs the data directly into the COP database 284. The COP 286 reads the information from the files and determines what customer is associated with the files. Next the COP 286 schedules the files to be downloaded by the data acquisition engine and writes these entries to data table 1, 290 and data table 2, 292 in the data acquisition engine. Data tables 1 and 2, 290 and 292, respectively, may contain lists of jobs for the data acquisition engine 294 to perform. Block diagram 280 terminates with the data acquisition engine 294 locating the various data sources as scheduled by the COP as described in reference to FIG. 4A.

Figure 13:
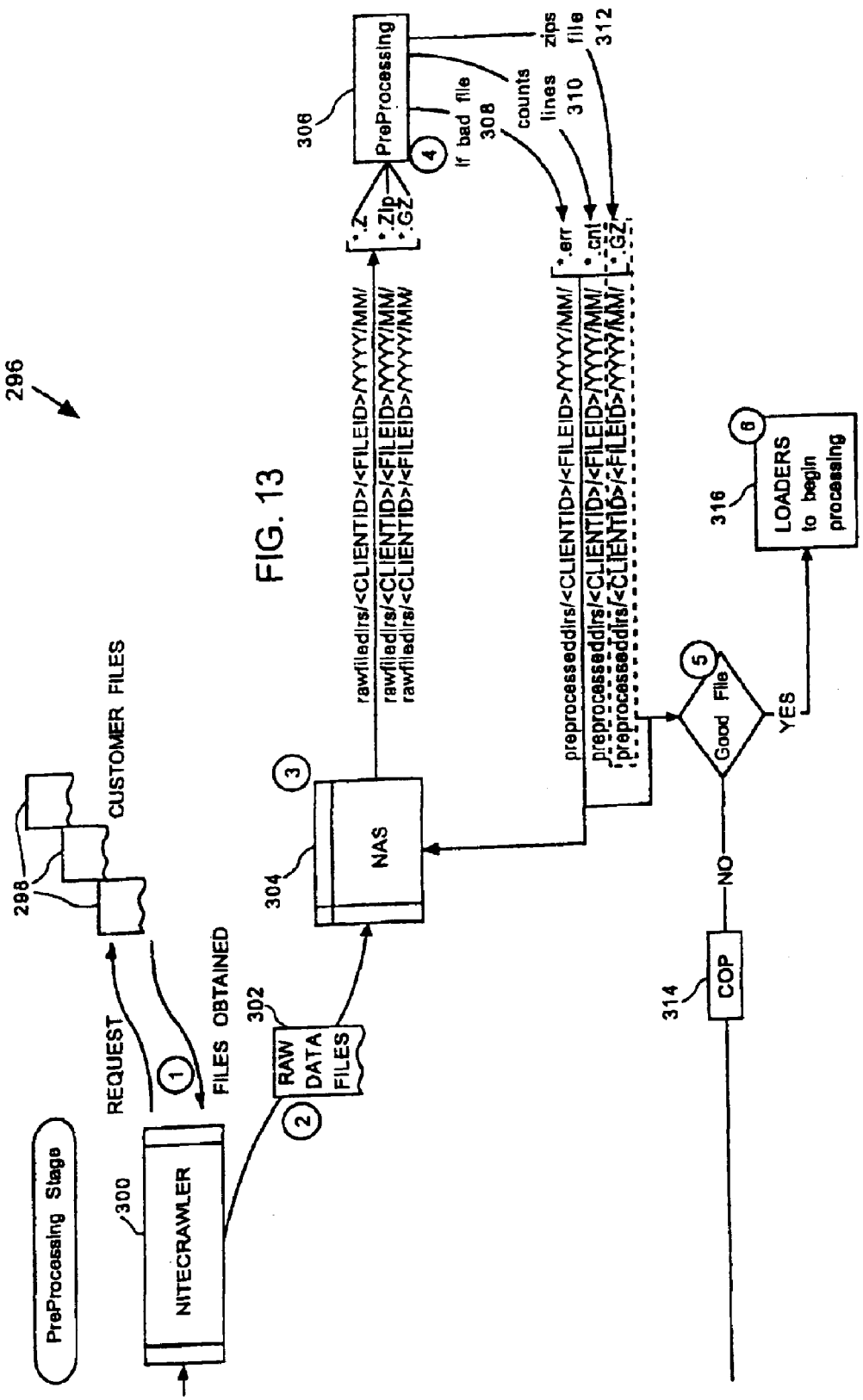
FIG. 13 is a block diagram which describes the pre-processing stage in accordance with one embodiment of the present invention.

FIG. 13 is block diagram 296 which describes the pre-processing stage in accordance with one embodiment of the invention. Block diagram 296 illustrates the data acquisition engine 300 which requests and obtains the raw data files 298 from the various data sources as specified by the customer in the customer user profile as described above. The raw data files 302 are transferred to a network attached storage (NAS) system 304 where the files are stored as raw data files in storage compartments within the NAS 304. Next, the pre-processing engine 306 checks the integrity of the raw data files in the NAS 304. The pre-processing engine 306 checks the integrity of the files by operation 308, where the pre-processing engine checks if the file is a bad file, operation 310, where the pre-processing engine counts the lines in the file and saves the file in the NAS with a ".cnt" extension, and operation 312, where the pre-processing engine zips the file and saves the file in a ".GZ" file format. If the pre-processing engine determines that the file is a bad file in operation 308, the file is transferred to the NAS with a ".err" extension and the COP 314 reschedules the acquisition of the raw data files 298 by the data acquisition engine 300. In one embodiment of the invention the COP 314 may reschedule the acquisition of the raw data files 298 up to three times before initiating an error message. As discussed in reference to FIG. 5, the pre-processing engine may generate error messages to the COP if the file is in an incompatible file format, if the file can not be unzipped, if the lines in the file can not be counted or if the file can not be zipped. If the pre-processing engine determines that the file is a good file then Block diagram 296 terminates with the scheduling of the files to begin processing the raw data by the loaders. As used herein a loader refers to a processing system which can be a distributed processing component in accordance with one embodiment of the present invention.

Figure 14:
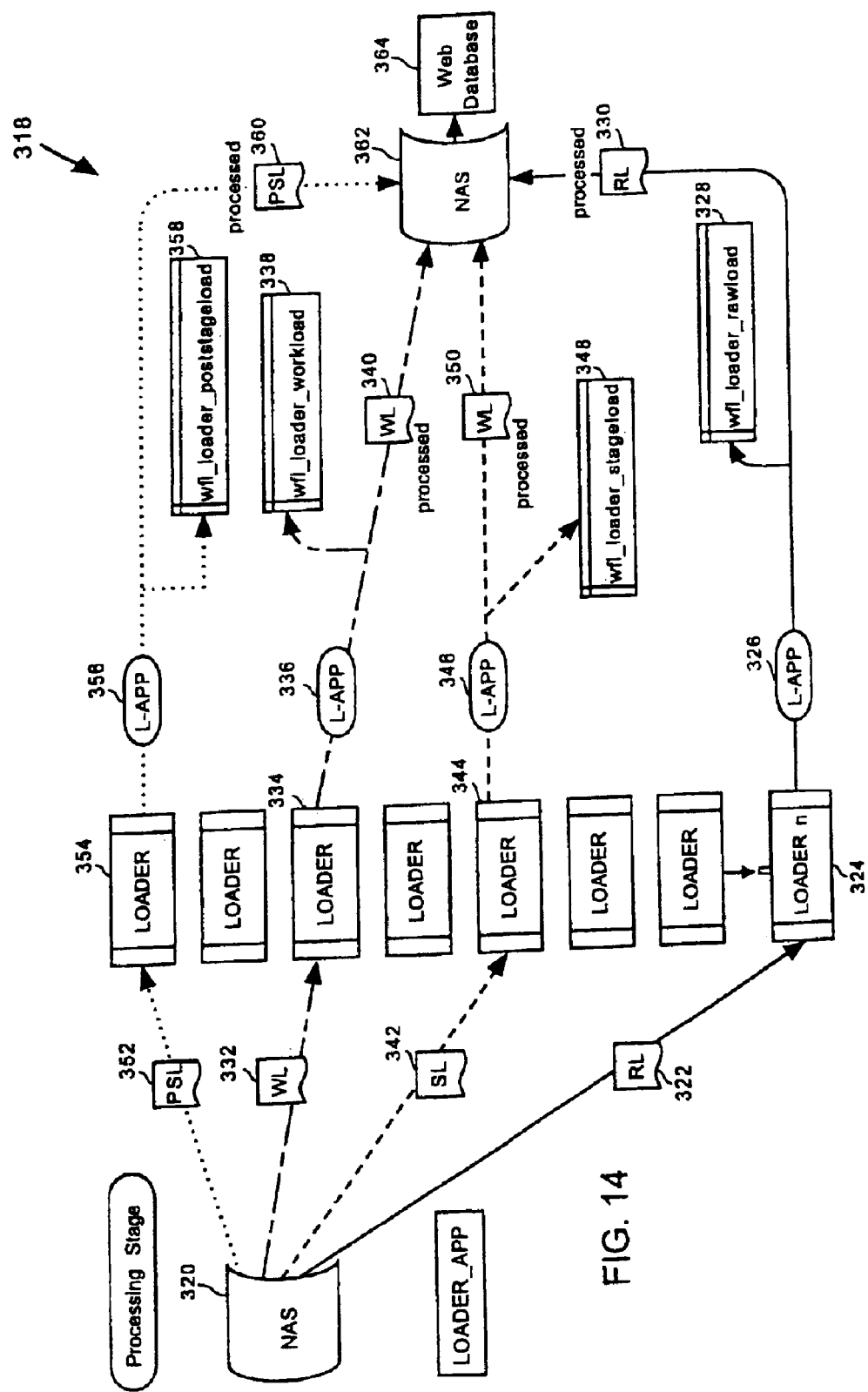
FIG. 14 is a block diagram where the processing stage transforms the raw data into processed data in accordance with one embodiment of the present invention.

FIG. 14 is a block diagram 318 where the processing stage transforms the raw data into processed data in accordance with one embodiment of the invention. Diagram 318 initiates with the raw load stage, where the raw data files 322 stored in the NAS are picked up by a loader 324. In a preferred embodiment of the invention the loader contains the temporary database and the format detector as discussed in reference to FIGS. 6 and 7. The raw data 322 is picked up by the loader 324, and is processed according to the rules in the loader application (L-APP) 326. In one embodiment, the L-APP is substantially equivalent in terms of functionality to the DTS discussed in reference to FIG. 6. Control table 328 controls the scheduling of the jobs performed by the loader 324 as dictated by the COP. The processed raw load data 330 is then stored in the NAS 362. Next the COP schedules the work load stage, where the visit data and pathway data is calculated. The work load data 332, which can be the processed raw load data 330 in accordance with one embodiment of the invention, is picked up by the loader 334 and is processed according to the rules in the loader application (L-APP) 336.

Control table 338 of FIG. 14, controls the scheduling of the jobs performed by the loader 334 as dictated by the COP. The processed work load data 340 is then stored in the NAS 362. Then the COP schedules the stage load, where the data is split into a number of files so that the processing will complete quicker. The stage load data 342, which can be the processed work load data 340 in accordance with one embodiment of the invention, is picked up by the loader 344 and is processed according to the rules in the loader application (L-APP) 346. Control table 348 controls the scheduling of the jobs performed by the loader 344 as dictated by the COP. The processed stage load data 350 is then stored in the NAS 362. Next the COP schedules operation 352, the post stage load, where all the data is aggregated and processed information is compiled into one file. The post stage load data 352, which can be the processed stage load data 350, is picked up by the loader 354 and is processed according to the rules in the loader application (L-APP) 356.

Control table 358 controls the scheduling of the jobs performed by the loader 354 as dictated by the COP. The processed post stage load data 360 is then stored in the NAS 362. The processed post stage load data may be referred to as processed data as described in reference to FIG. 7.

Once the processed post stage load data 360 of FIG. 14 is stored in the NAS the post stage load data is ready to transfer to a customer's web database. In a preferred embodiment of the invention the NAS 320 and the NAS 362 may be the same network attached storage system. The COP then transfers the post stage load data and corresponding format file to the customer's web database 364. The customers web database 364 is accessed by the report generators to present pre-formatted or canned presentations, thus allowing for rapid uploading of the presentation. As such, in one specific embodiment, there will be one web database 364 for each customer. It should be understood that the loaders as dictated by the COP perform distributed processing in order to more efficiently process the data, which is a distinction over the prior art. As discussed in reference to FIGS. 6 and 7 the temporary databases contained within the loaders may transfer any data into and out of the temporary database by performing a parallel memory map in accordance with one embodiment of the invention. It should also be understood that the loaders may share distribution of all phases of the data processing stage displayed in FIG. 14. While the above description refers to one loader performing the jobs for each stage, it can be appreciated that multiple loaders can be utilized for each stage which will increase the speed and efficiency of the processing.

Figure 15:
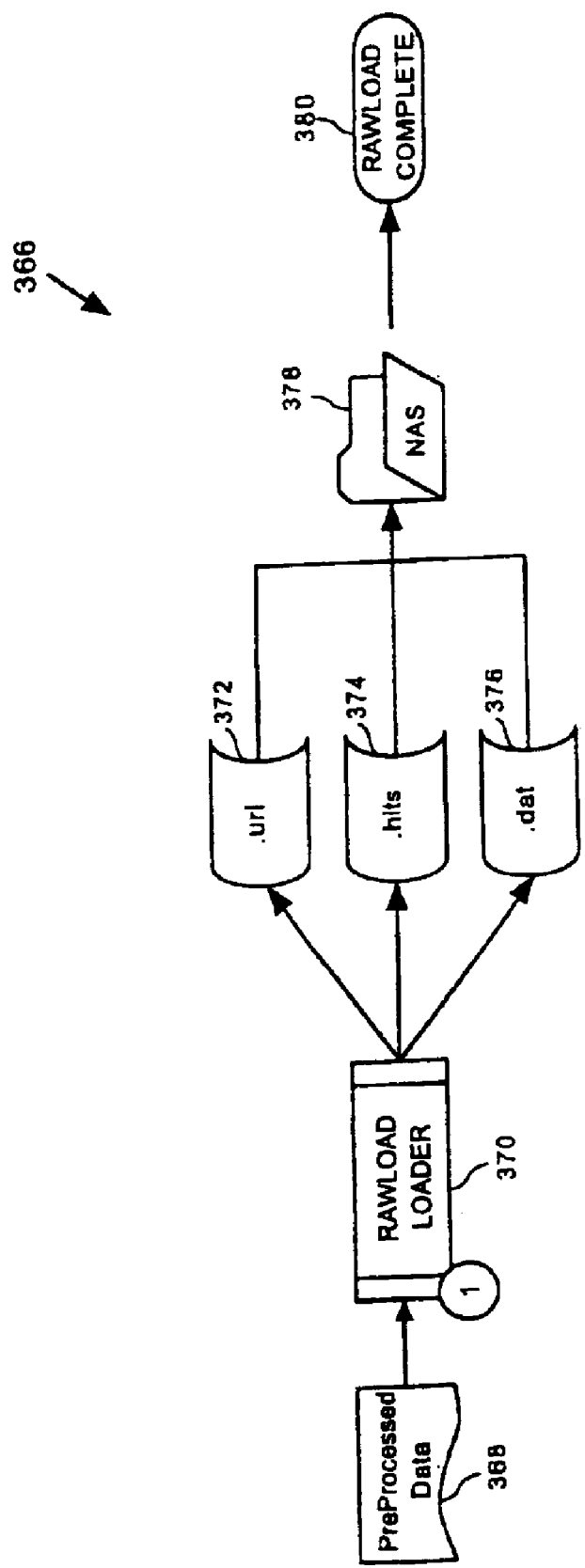
FIG. 15 is a block diagram defining a more detailed description of the raw load stage in accordance with one embodiment of the present invention.

FIG. 15 is a block diagram 366 defining a more detailed description of the raw load stage in accordance with one embodiment of the invention. Block diagram 366 illustrates the pre-processed raw data 368 which is pulled by a loader 370. The loader segments the files into 3 files: ".url" files 372, ".hits" files 374, and ".dat" files 376. The three files are then transferred to storage compartments in the NAS 378. Block diagram 366 terminates with a notification to the COP that the raw load stage is complete.

Figure 16:
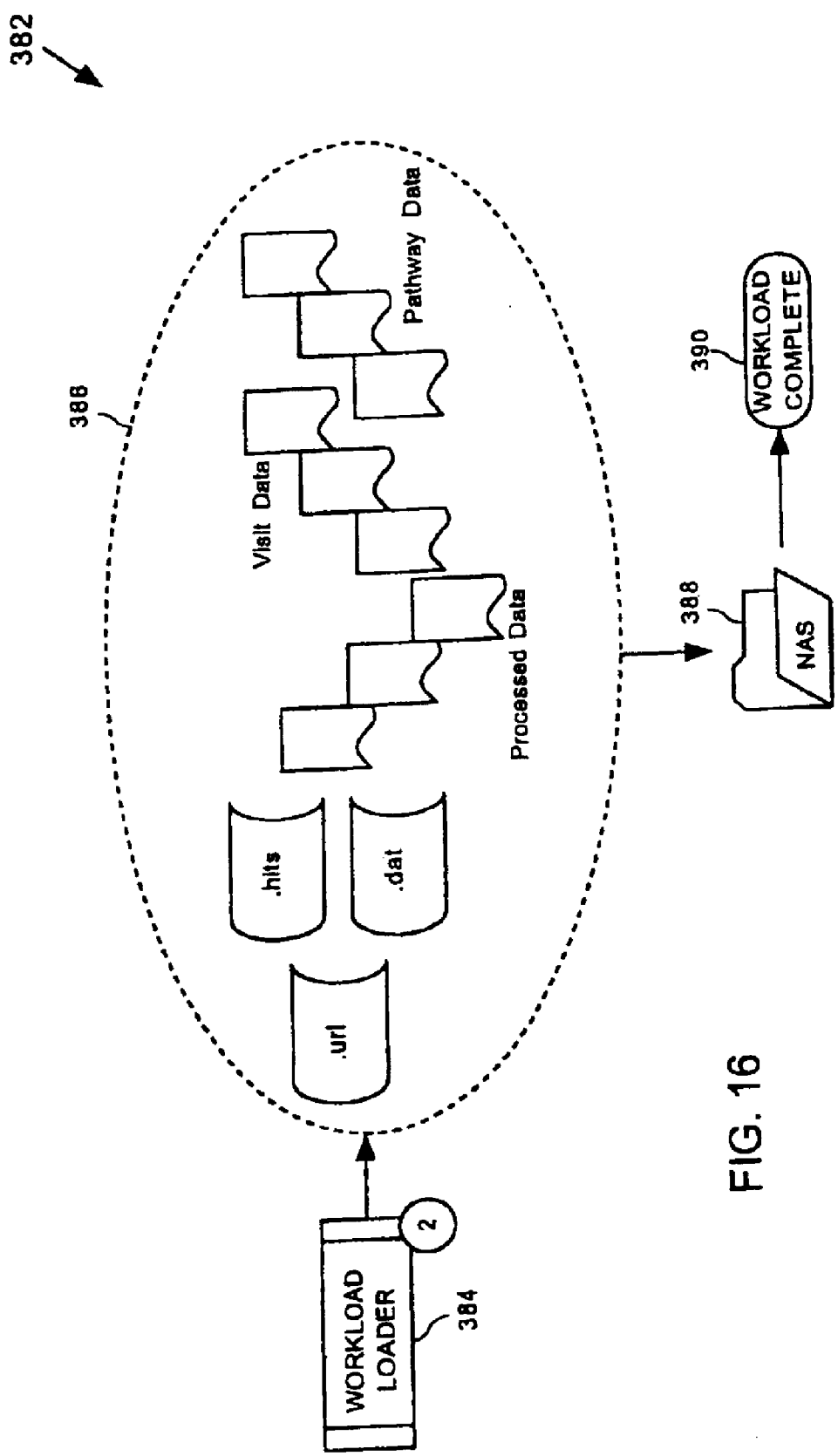
FIG. 16 is a block diagram defining a more detailed description of the work load stage in accordance with one embodiment of the present invention.

FIG. 16 is a block diagram 382 defining a more detailed description of the work load stage in accordance with one embodiment of the invention. Block diagram 382 illustrates a loader 384 which has pulled the raw load data from a storage compartment. Next the data transformation engine calculates the visit data, the pathway data and creates files for the visit data and pathway data in operation 386. As used herein, the visit data can include the number of times a web page has been visited over a time period and the pathway data can include the source path from where a visitor came prior to entering a customer's web page. The crated files are stored in storage compartments in the NAS 388. Block diagram 382 terminates with a notification to the COP that the work load stage is complete.

Figure 17:
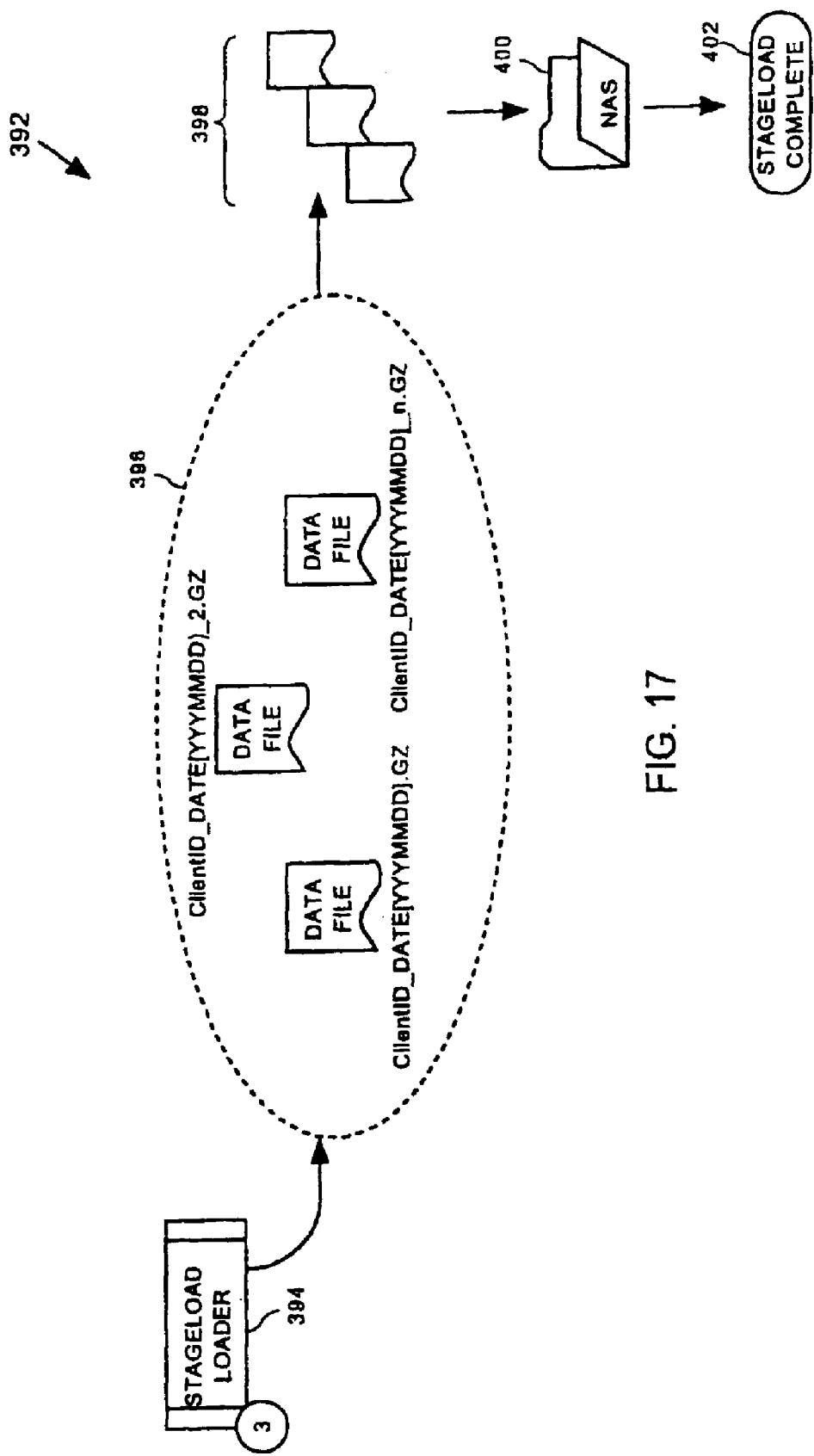
FIG. 17 is block diagram defining a more detailed description of the stage load in accordance with one embodiment of the present invention.

FIG. 17 is block diagram 392 defining a more detailed description of the stage load in accordance with one embodiment of the invention. Block diagram 392 illustrates a loader 394 which has pulled the work load data from a storage compartment. Next, the data transformation engine splits the data files in operation 396 so that processing according to the rules dictated by the COP can be expedited. After the data files are processed according to the rules dictated by the COP, the files are moved 398 and stored in storage location compartments in the NAS 400. Block diagram 392 terminates with a notification to the COP that the stage load stage is complete.

Figure 18:
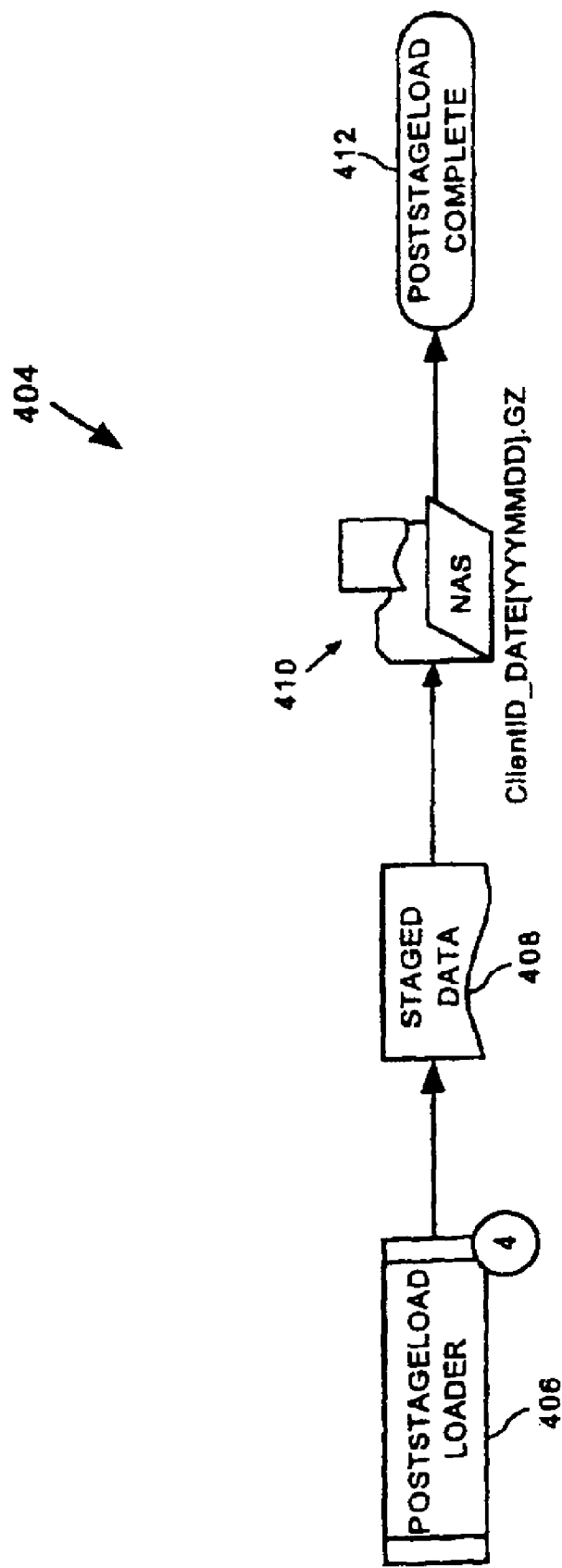
FIG. 18 illustrates a block diagram defining the post stage load stage in more detail in accordance with one embodiment of the present invention.

FIG. 18 illustrates a block diagram 404 defining the post stage load stage in more detail in accordance with one embodiment of the invention. Block diagram 404 illustrates a loader 406 which has pulled the stage load data 408 from a storage compartment. The loader aggregates multiple batches to a single file in the NAS 410. Block diagram 404 terminates with a notification to the COP that the post stage load stage is complete.

Figure 19:
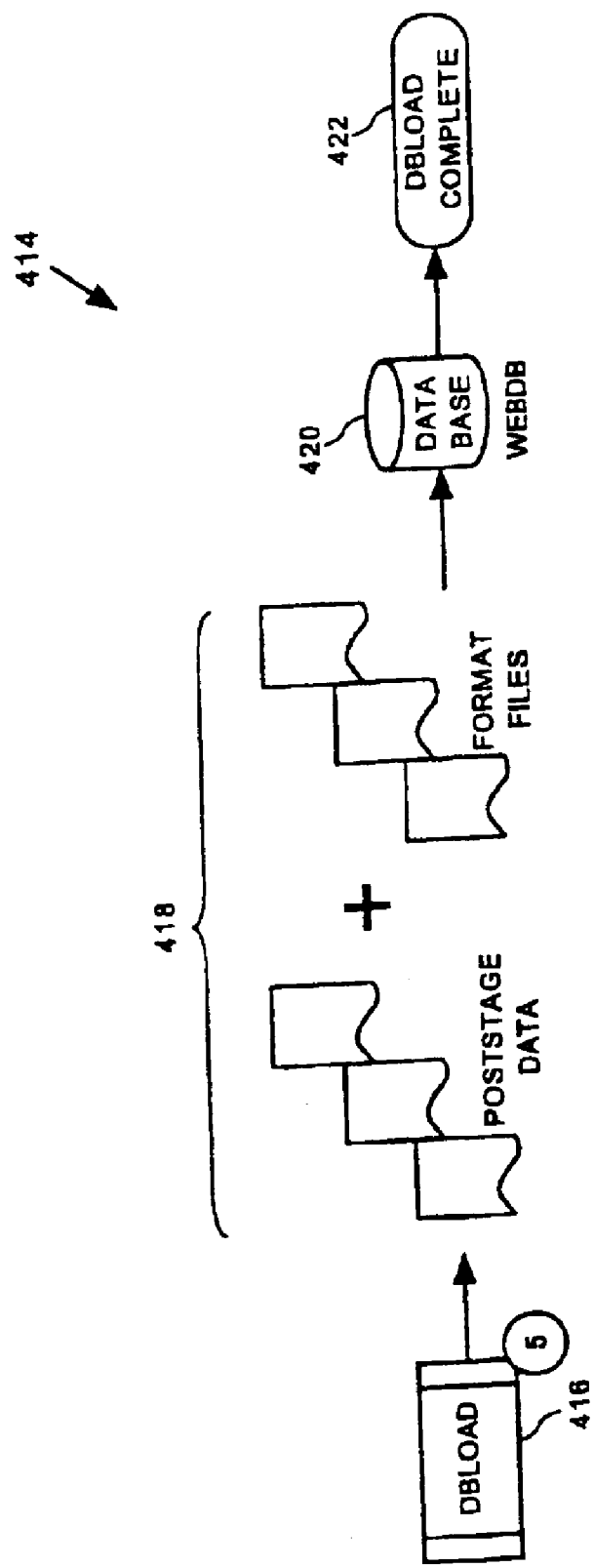
FIG. 19 is a block diagram defining the database load stage in more detail in accordance with one embodiment of the present invention.

FIG. 19 is a block diagram 414 defining the database load stage in more detail in accordance with one embodiment of the invention. Block diagram 414 illustrates a loader which moves post stage load data and format files to a customer's web database. The type of subscription purchased by the customer will determine the web database that the post stage load data and format files are stored. For example, the Assignee currently has three levels of subscription services: standard, professional and enterprise. For the standard subscription level, the web database is a shared database with other standard subscription level customers. For the professional subscription level, the web database is a shared database with other professional subscription level customers. For the enterprise subscription level the web database is a dedicated database for each enterprise customer. As discussed in reference to FIG. 14, the web database contains the post stage load data and corresponding format files. The post stage load data, also referred to as the processed display data, can be accessed quickly from the web database thus allowing for the rapid display of pre-formatted or canned presentations for the customer to view. Block diagram 414 terminates with a notification to the COP that the database load stage is complete.

The invention described herein is described with reference to a single customer. However, the embodiments of the invention can be performed for any number of customers. For example, the above described system may be a multi-tenant distributed application designed for multiple customers. In one embodiment of the invention additional customers can be serviced by adding loaders. It can also be appreciated that in object-based programming (e.g., C++, Java™, etc.) a particular object may be reproduced from its class through instantiation. In particular, multiple instances of the data acquisition engine, the loader application or the COP application of the present invention can be executed to serve multiple customers or perform multiple tasks for the same customer all at one time. One skilled in the art would appreciate that any function or operation of the present invention may executed any number of times to meet the demands of a particular system or environment.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for acquiring and transforming data for business analysis, comprising:

identifying a set of data sources to be accessed for a user;

loading raw data from each of the accessed set of data sources;

verifying the integrity of acquired raw data;

transforming the acquired raw data to processed data, the transforming further including, converting each of the acquired raw data to a uniform format, transferring the converted raw data to a temporary database, applying processing rules to the converted raw data, the processing rules being configured to define processed data, and storing the processed data in a processed data type specific location from the temporary database;

transferring the processed data to a temporary database; and applying display rules, the display rules being configured to define a format and content of a requested report.

2. A method for acquiring and transforming data for business analysis as recited in claim 1, wherein the transferring the converted raw data to a temporary database further comprises:

performing a memory map transfer.

3. A method for acquiring and transforming data for business analysis as recited in claim 2, wherein the memory map transfer is a parallel memory map transfer.

4. A method for acquiring and transforming data for business analysis as recited in claim 1, wherein the acquired raw data and the processed data are stored in one or more hard drives.

5. A method for acquiring and transforming data for business analysis as recited in claim 1, wherein the acquired raw data is associated to a unique identification defining a customer and source path for the acquired raw data.

6. A method for acquiring and transforming data for business analysis as recited in claim 1, wherein the temporary database can be one or more databases.

7. A computer implemented method for acquiring and transforming data for business analysis, comprising:

identifying a set of data sources to be accessed for a user;

loading raw data from each of the accessed set of data sources;

verifying the integrity of acquired raw data;

transforming the acquired raw data to processed data, the transforming further including, convening each of the acquired raw data to a uniform format, transferring the converted raw data to a temporary database, the transferring performed by a parallel memory map, applying processing rules to the converted raw data, the processing rules being configured to define processed data, and storing the processed data in a processed data type specific location from the temporary database;

transferring the processed data to a temporary database, the transferring performed by a parallel memory map; and applying display rules, the display rules being configured to define a format and content of a requested report.

8. A method for acquiring and transforming data for business analysis as recited in claim 7, wherein the temporary database can be one or more databases.

9. A method for acquiring and transforming data for business analysis as recited in claim 7, wherein the acquired raw data is associated to a unique identification defining a customer and source path for the acquired raw data.

* * * * *